(12) United States Patent
Gandelheidt

(10) Patent No.: US 10,137,629 B2
(45) Date of Patent: Nov. 27, 2018

(54) BLOWN FILM INSTALLATION, METHOD FOR PRODUCING A BLOWN FILM STRIP AND FILM PRODUCED THEREWITH

(71) Applicant: Reifenhaeuser GmbH & Co. KG Maschinenfabrik, Troisdorf (DE)

(72) Inventor: Edgar Gandelheidt, Worms (DE)

(73) Assignee: Reifenhaeuser GmbH & Co. KG Maschinenfabrik, Troisdorf (DE)

( * ) Notice: Subject to any disclaimer, the term of this patent is extended or adjusted under 35 U.S.C. 154(b) by 132 days.

(21) Appl. No.: 14/404,875

(22) PCT Filed: Aug. 7, 2013

(86) PCT No.: PCT/DE2013/000441
§ 371 (c)(1),
(2) Date: Dec. 1, 2014

(87) PCT Pub. No.: WO2014/023282
PCT Pub. Date: Feb. 13, 2014

(65) Prior Publication Data
US 2015/0151482 A1    Jun. 4, 2015

(30) Foreign Application Priority Data
Aug. 7, 2012    (DE) ........................ 10 2012 015 462

(51) Int. Cl.
*B29C 55/28*     (2006.01)
*B29C 47/00*     (2006.01)
(Continued)

(52) U.S. Cl.
CPC .......... *B29C 55/28* (2013.01); *B29C 47/0021* (2013.01); *B29C 47/0026* (2013.01);
(Continued)

(58) Field of Classification Search
None
See application file for complete search history.

(56) References Cited

U.S. PATENT DOCUMENTS

| 2,976,567 A | 3/1961 | Jones et al. |
| 3,116,787 A | 1/1964 | Campbell |

(Continued)

FOREIGN PATENT DOCUMENTS

| AT | 267 160 B | 12/1968 |
| AT | 311 666 B | 11/1973 |

(Continued)

OTHER PUBLICATIONS

European Office Action in EP 13 759 424.8-1706, dated Oct. 26, 2015, with English translation of relevant parts.

(Continued)

*Primary Examiner* — Monica A Huson
(74) *Attorney, Agent, or Firm* — Collard & Roe, P.C.

(57) ABSTRACT

In blown film installations, it is known to provide longitudinal stretching of the produced double layer film strip downstream of the draw-off, more precisely downstream of the reversing unit and upstream of the winder. It is also known to stretch the down-drawn film, wherein the film must then be preheated owing to the long cooling path from the draw-off. According to a first feature, the present invention specifies warming the film above the draw-off and then treating it mechanically. The film can thereby be brought with only little energy from a first level of warmth to a temperature level at which it can easily be worked. According to a second feature, the invention specifies providing a tractive force breakdown brake.

33 Claims, 9 Drawing Sheets

Figure 1:
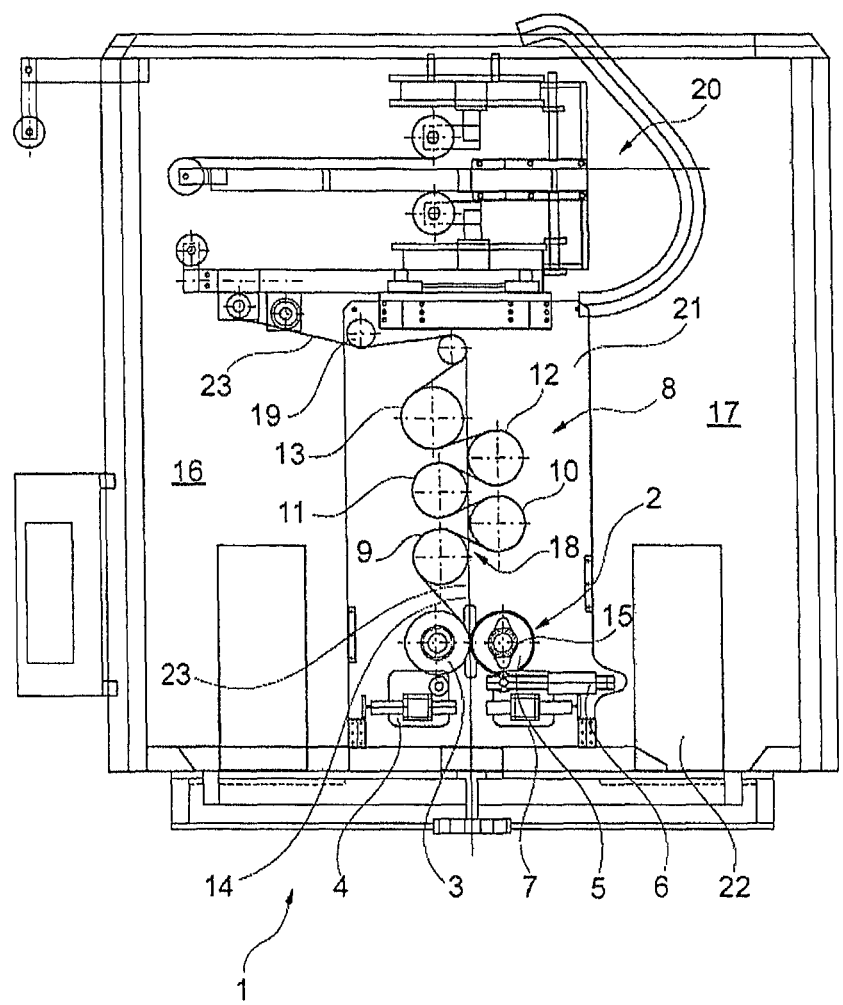

(51) Int. Cl.
*B29C 55/06* (2006.01)
*B29C 47/88* (2006.01)
*B29C 55/02* (2006.01)
*B29C 55/12* (2006.01)
*B29C 71/04* (2006.01)
*B29C 47/90* (2006.01)
*B29C 47/92* (2006.01)
*B29K 23/00* (2006.01)

(52) U.S. Cl.
CPC ...... *B29C 47/0057* (2013.01); *B29C 47/0061* (2013.01); *B29C 47/8805* (2013.01); *B29C 47/8845* (2013.01); *B29C 47/90* (2013.01); *B29C 47/908* (2013.01); *B29C 47/92* (2013.01); *B29C 55/023* (2013.01); *B29C 55/06* (2013.01); *B29C 55/12* (2013.01); *B29C 71/04* (2013.01); *B29C 2947/92171* (2013.01); *B29C 2947/92447* (2013.01); *B29C 2947/92523* (2013.01); *B29C 2947/92666* (2013.01); *B29K 2023/12* (2013.01); *B29K 2883/005* (2013.01); *Y10T 428/31504* (2015.04)

(56) References Cited

U.S. PATENT DOCUMENTS

| | | | |
|---|---|---|---|
| 3,340,565 | A | 9/1967 | Holly |
| 3,725,519 | A | 4/1973 | Seifried et al. |
| 3,768,949 | A | 10/1973 | Upmeier |
| 3,819,776 | A | 6/1974 | Robinson et al. |
| 3,891,737 | A * | 6/1975 | Marsh ................ B29C 47/0026 264/230 |
| 4,086,045 | A | 4/1978 | Thiel et al. |
| 4,634,358 | A | 1/1987 | Dellbrugge |
| 4,676,728 | A | 6/1987 | Planeta |
| 5,458,841 | A | 10/1995 | Shirrell |
| 5,727,723 | A | 3/1998 | Cree |
| 6,241,502 | B1 * | 6/2001 | Baeumer ............. B29C 47/0009 425/326.1 |
| 6,413,346 | B1 | 7/2002 | Planeta et al. |
| 6,447,278 | B1 | 9/2002 | Arruda |
| 6,713,564 | B1 | 3/2004 | Nobuhara et al. |
| 7,396,498 | B1 | 7/2008 | Johnstone |
| 7,946,841 | B2 | 5/2011 | Arcan |
| 2005/0263940 | A1 | 12/2005 | Backmann et al. |
| 2015/0151482 | A1 | 6/2015 | Gandelheidt |

FOREIGN PATENT DOCUMENTS

| | | |
|---|---|---|
| AT | 342 292 B | 3/1978 |
| CH | 432 815 A | 3/1967 |
| CH | 475 082 A | 7/1969 |
| DE | 1 504 461 A1 | 4/1969 |
| DE | 21 32 259 C3 | 1/1973 |
| DE | 2 146 266 A1 | 6/1973 |
| DE | 35 08 626 C1 | 2/1986 |
| DE | 692 08 002 T2 | 6/1996 |
| DE | 102 42 174 A1 | 3/2004 |
| EP | 0 531 021 A1 | 3/1993 |
| EP | 0 673 759 A1 | 9/1995 |
| EP | 1 147 877 A2 | 10/2001 |
| EP | 2952330 A1 | 12/2015 |
| GB | 989 323 A | 4/1965 |
| GB | 1 387 030 A | 3/1975 |
| GB | 2 201 371 A | 9/1988 |
| WO | 2005/102666 A1 | 11/2005 |

OTHER PUBLICATIONS

International Search Report of PCT/DE2013/000441, dated Nov. 27, 2013.

* cited by examiner

BLOWN FILM INSTALLATION, METHOD FOR PRODUCING A BLOWN FILM STRIP AND FILM PRODUCED THEREWITH

CROSS REFERENCE TO RELATED APPLICATIONS

This application is the National Stage of PCT/DE2013/000441 filed on Aug. 7, 2013, which claims priority under 35 U.S.C. § 119 of German Application No. 10 2012 015 462.3 filed on Aug. 7, 2012, the disclosure of which is incorporated by reference. The international application under PCT article 21(2) was not published in English.

The invention relates to a blown film installation, a method for producing a blown film strip and a film produced therewith.

Blown film installations are known. The installations are supplied with plastic materials in a granulated form, which are then plasticized under high pressure in extruders to form a viscous mass. This mass is shaped into an annular shape in a blown film die and escapes the blown film die through an annular nozzle. Right after leaving the annular nozzle, the mass already forms a film tube. The film tube is hauled off upwards along a tube forming area, in which pressurized air is introduced into the inside of the film tube. This leads to a transverse expansion of the film tube. A cooling of the ascending melt is achieved at a tolerable distance from the annular nozzle by means of an active cooling means. On its way upward, the film tube flows in a mostly partially crystallized state through a calibration cage and then through a collapsing frame, which flattens the tube. The collapsing unit guides the double layer film strip toward a pre-squeeze device. The pre-squeeze device usually consists of a pair of rollers, the film running through the gap between the rollers—often called "nip". The pre-squeeze device is followed by a squeeze device, in which a double layer film strip them is definitely formed with practically no air in between the layers. From that moment on, at the latest, but rather before the pre-squeezing, a double layer film strip is provided. The distance between the pre-squeeze device and the squeeze device is calculated in such a manner that the film can give off heat from the extrusion process during the transport between the two pairs of rollers. In this manner, the film strip is additionally cooled, so that it can then be processed. Such a processing may be a cutting of the film tube so that two separate film strips are created.

Many installations operate without a pre-squeeze device but rather guide the film from the collapsing frame directly to the squeeze device. In an installation with such a configuration, by the time it reaches the pair of squeezing rollers, the ascending film has already cooled down to such an extent that a force application on the surface of the film does not damage it or only slightly. Indeed, the squeeze device normally hauls the film upwards at a considerably higher speed than the speed at which it is being extruded from the annular nozzle. An exemplary speed ratio would be 10:1 to 20:1. During formation of the tubular shape, the blown film is immediately impinged with pressurized air from the inside above the annular nozzle and thus drawn in the transverse direction. At the same time, the pair of squeezing rollers hauls the film off in an upward direction at high speed, so that a longitudinal stretching is achieved below the frost line.

As a whole, the film tube is thus biaxially stretched below the frost line. Depending on the intended use of the final film product, the longitudinal stretching or the transverse stretching can predominate.

However, a blown film installation always has to contend with the technical disadvantage that the visual quality of the film cannot keep up with the quality of cast films. This is due to the fact that the ascending film tube cools down relatively slowly. The longer the cooling process of the plastic melt, the hazier and the less bright the film surface will be.

In order to be able to exert a sufficient force onto the ascending film with the pair of squeezing rollers, the film must be sufficiently cooled down. In view of the slow cooling speed of the extruded film, this leas to a high construction height of blown film installations. Above the squeeze unit, the double layer film strip is thus redirected into the horizontal direction as fast as possible, led past the installation and then downward for the subsequent processing steps. A winder, which winds the double layer film strip into a roll for further transport, is usually disposed next to the installation on the floor of the installation site.

Sometimes, stretching devices are disposed upstream of the winder, wherein in the present invention, the term "stretching" must be understood as a generic term for a "longitudinal stretching".

A stretching installation stretches the film, at any rate in the longitudinal direction, by 5%, preferably by 50% and more, often also up to 1000%. Such installations are often referred to as "MDOs", which stands for "machine direction orientation", i.e. for an orientation of the plastic molecules in the direction of the machine, i.e. in the direction of transport of the plastic through the installation.

DE 2 146 266 for example discloses a stretching installation, in which extruders disposed on a rack above a vertically running blow line reverse. The pair of haul-off rollers is followed by a set of rollers, followed in turn by a second pair of squeezing rollers. The second pair of squeezing rollers runs faster than the first one, so that the double layer film strip is stretched in the machine direction. The cooling path of the film tube upstream of the first pair of squeezing rollers is adjustable, so that it runs through it at the highest possible temperature, so that it can be stretched ideally without additional heating. The stretching ratio can also be adjusted, simply by way of the second pair of squeezing rollers, since rollers of the set of rollers are passive at least at the beginning.

Alternately to an MDO, a so-called flattening package can be provided as a stretching device upstream of the winder. It irreversibly "expands" the film by between 0.5% and 5% in the machine direction, which merely serves to compensate for differences in weight along the width of the double layer film strip and in the straight direction of the film strip, so that the film can be wound up and processed more easily.

Both stretching devices, i.e. an MDO and a flattening package are comparable in technical terms, in that they implement a longitudinal stretching of the film. To this end, a first slower roller is followed immediately, or for example after additional passive rollers, by a faster driven roller. Due to the speed difference between the two rollers, which can also be designed as pairs of squeezing rollers that respectively transport the film by static friction, the length of the film is modified.

The distance between the two areas in which the film is transported at the circumferential speed of the respective roller, is referred to as "stretching section", or when projected onto the machine direction as "stretching length".

In an approximately central section of the wrap of the film strip around a roller, the film strip is transported by static friction, hence at the circumferential speed of the roller. The static friction ends before the film strip leaves the surface of the roller at a lift-off point. This matters particularly when the subsequent roller runs at a higher circumferential speed, i.e. when the film strip transitions from a state of static friction to a faster state of kinetic friction while still on the surface of the roller and only subsequently lifts off from the surface of the roller.

The same principle applies when the film runs onto a roller: the film strip already comes into contact with the revolving surface of the roller at a contact point, but static friction only starts beyond the contact point.

For the sake of convenience, the term "points" is used here. A film strip lifts off from a roller along a lift-off line and comes in contact with a roller surface along a contact line. In a lateral view, the two-dimensional film strip is reduced by one dimension to a line, so that the lift-off line and the contact line are respectively correspondingly reduced by one dimension to points.

It must be pointed out that instead of a roller, a pair of squeezing rollers can, as a rule, be used just as well for transporting the film. For the sake of convenience, the present application mostly only uses the term "roller" when referring both to a pair of squeezing rollers and to replacements known to the person skilled in the art.

A pair of squeezing rollers tends to result in a secure grasping of the film because the film surface is grabbed from both sides. However, a roller acting from one side can also exert a sufficient longitudinal force onto the film, depending for example on the surface design of the roller interacting with the respective film to be processed and for example on the wrapping angle of the roller. A simple driven roller will usually be provided with a pressure roller, in order to ensure that the film is in fact more reliably grabbed by the driven roller and that a slipping is prevented.

The problem underlying the invention is to improve the prior art or to provide an alternative to it.

According to a first aspect of the invention, this problem is solved by a blown film installation with an annular nozzle for extruding a film tube, with a tube forming area for longitudinal and transverse stretching of the film tube, with a cooling means for the film tube moving in the machine direction, with a collapsing section for collapsing the film tube into a double layer film strip and with a pair of haul-off rollers beyond the cooling means for hauling-off the film tube, wherein a processing roller line is provided beyond the pair of haul-off rollers for longitudinally stretching the double layer film strip with a heating means for the double layer film strip, wherein the blown film installation is characterized in that the machine direction is oriented vertically in a bottom-top direction and the processing roller line is disposed above the pair of haul-off rollers.

The following terms are explained as follows:

As has been previously explained, the "pair of haul-off rollers" can preferably be a simple pair of haul-off rollers. However, in the present invention, a pair of pre-haul-off rollers can also be connected upstream of the pair of haul-off rollers, wherein the haul-off is often also referred to as a squeezing device or a squeezer.

In the case of such an arrangement with two pairs of rollers, the pair of haul-off rollers, which ultimately implement the squeezing, are disposed, as a rule, above the pair of pre-haul-off rollers.

A pair of haul-off rollers differs from the rollers or pairs of rollers disposed below it in that it guides the tube in an either completely or almost completely flattened state, i.e. as a double layer film strip. The pair of haul-off rollers engages with the surface of the flattened film on both sides, amongst others in order to reduce the possibility of pressurized air being pressed upwards out of the inner space of the film tube.

The diameter of a haul-off roller often amounts to approximately 300 mm. One can also find diameters of between 200 mm and 400 mm or more. When pre-haul-off rollers are additionally provided, they often have the same size as the haul-off rollers.

The "processing roller line" is a transport path designated for the double layer film strip inside which the double layer film strip is to be subjected to a mechanical and thermal treatment, in particular an irreversible stretching in the machine direction, i.e. when seen at a local level, in the longitudinal direction of transport.

At least two, three, four, five, six or more rollers (or pairs of squeezing rollers) are to be provided in the processing roller line, wherein these at least two, three, four, five, six or more rollers must fulfil different functions inside the processing roller line. These functions may be: holding, heating, stretching, tempering, cooling, transverse stretching, stamping or laminating.

One roll can fulfil several functions simultaneously, such as holding and heating for example.

Normally, one aims at using the smallest possible number of rollers.

The "heating means" is an active heating means, i.e. is more specifically equipped with a current-carrying heating coil, an infrared radiator, a laser emitter, a hot water conduit, an oil heating, generally a fuel-powered heating with a circuit and/or a comparable active heating means. The extrusion leads to the accumulation of a lot of heat. That heat rises anyway. This and the fact that the film tube also carries heat and transports it into the pulling section leads to the installation parts above the pair of haul-off rollers being rather warm during operation of the installation. However, the term heating means does not refer to these passively heating components. Rather, an actively heating means is to be provided.

In most cases, such a heating means will be identifiable by the fact that it has a temperature sensor in addition to the actual heating or that the heating means has a control system, more specifically with a hysteresis control.

In this context, it must be pointed out that within the scope of the present patent application, the term "control" also includes the notion of an "open loop control". The previously mentioned "control" therefore more specifically refers to a technical "closed loop control", i.e. with a sensor for adjusting the current values but also includes an "open loop control", i.e. for example a heating spiral, which is only switched on intermittently and then switched off again.

Alternately or in addition to a temperature sensor on the heating means, a heating means can also be easily distinguished from an equipment that became hot during operation by the fact that, when the installation is cold, the preheating means quickly lead to a heating-up of the heating means. Thus, the heating means are also usable for heating up the installation, which is quicker than if the installation components in the upper area of the installation are heated up by the operation of the installation.

In a particularly preferred embodiment, a positioning "above" the pair of haul-off rollers refers to an arrangement in which the processing roller line is at any rate at least partially located vertically immediately above the pair of haul-off rollers, meaning a design which would lead, when projected onto a horizontal plane running through the pair of haul-off rollers, to an intersection with the projection of the pair of haul-off rollers.

It may be sufficient if a circumferential line around the processing roller line can be projected in this manner. It is therefore unnecessary for one of the rollers of the processing roller line to be projectable onto the horizontal so that it intersects with it, the latter being however a preferred embodiment.

It is particularly advantageous if at least one, two, three, four, five, six or several rollers of the processing roller line are disposed so that their axes are parallel to the haul-off rollers.

As has already been mentioned, each single roller can be replaced by respectively one pair of squeezing rollers.

Alternately and cumulatively, the rollers of the processing roller line can have about the same size as the pair of haul-off rollers, for example with diameters ranging from 200 mm to 400 mm or more, preferably between 250 mm and 300 mm, but also much smaller than the pair of haul-off rollers, for example with diameters between 100 mm and 200 mm or less.

A particularly compact arrangement is achieved when at least one roller of the processing roller line, preferably two, three, four, five, six or more rollers of the processing roller line is, respectively are, can be projected onto the horizontal so that they overlap with one or both haul-off rollers at least by half.

Alternately and cumulatively, it is advantageous if rolls of the processing roller line also overlap each other at least by half when projected onto the horizontal.

It goes without saying that a greater overlap than by half can be even more advantageous if appropriately designed.

A less compact geometry but which still lies within the extended scope of the invention would be one in which the previously mentioned projections do not directly lead to an overlap with the haul-off rollers. Rather, one must imagine a circular surrounding line around the pair of haul-off rollers. The surrounding line forms a horizontal circular surface. If the vertical projection of one, several or even all the rollers of the processing roller line fall into this surface, whether partially or as a whole, this still results in a very compact installation. Simply put, the rollers of the processing roller line then do not necessarily lie exactly vertically above the pair of haul-off rollers but in its general vicinity.

In a broader sense, the location "above" can also be fulfilled when the processing roller line is indeed provided laterally next to the pair of haul-off rollers, respectively next to the upper area of the blown film installation, but at least one roll of the processing roller line, preferably several or even all the rollers of the processing roller line, is disposed geodetically higher than the processing roller line. If a pair of rollers is provided, the geodetic height of the nip of the pair of rollers must be considered in this context.

The arrangement according to this aspect of the invention of the processing roller line above the pair of haul-off rollers with a heating means for the double layer film strip is advantageously usable for heating the film above the temperature that it has after running through the haul-off rollers. It has already been explained that the film must cool down in order to safely run through the pair of haul-off rollers because of the forces that are exerted there onto the film. It must therefore be cooled below a temperature at which there is dimensional stability, in order not to damage the film.

However, in order to implement a mechanical processing of the film, more specifically in form of a stretching by means of a tensile force, it can be advantageous if the film has been heated. For example, an MDO can heat up the film upstream of the mechanical longitudinal stretching by means of a powerful heating roller.

The invention is based on the discovery that on its way upwards and not downwards the film can benefit from the heat rising from the extruders and from the blown film die. It may be true that it is not easy to cool down the ascending film, but in return, one can assume that there will be less of a temperature gradient within the processing roller line. As opposed to DE 2 146 266, the quality of the production is thus surprisingly considerably better.

This is due to the fact that the invention intervenes precisely at that point in which the initial heat is still present, i.e. the film has cooled down just enough to be grabbed by the pair of haul-off rollers but is still relatively warm and thus does not need to be heated up as much. The invention proposes to provide the heating means above the pair of haul-off rollers, because the heating means does not have to reheat as strongly in that location as in other positions in the installation. Thus, for any type of mechanical processing that requires heat, this arrangement also leads to significant energy savings.

Such an arrangement cannot be found anywhere in the prior art: EP 1 147 877 A2 discloses in a second embodiment shown in FIG. 5 a production installation for a stretch film, wherein the initial heat is however no longer present in the stretching section between the pair of stretching rollers, because the double layer film strip is first guided laterally around the pair of haul-off rollers and is stretched at a much later point. More specifically, there is only little or no ascending first heat from the film blowing process.

The same applies to U.S. Pat. No. 6,413,346 B.

U.S. Pat. No. 2,976,567 shows a cast film installation, not a blown film installation. Thus it does not have a pair of haul-off rollers nor a heat accumulation effect above the blown film die and thus above a pair of squeezing rollers.

In U.S. Pat. No. 7,396,498 B1 an optional drawing of the double layer film strip occurs at the very bottom directly next to the blown film head, i.e. virtually on the floor of the hall.

U.S. Pat. No. 5,458,841 implements a longitudinal stretching between a pair of pre-haul-off rollers and the pair of haul-off rollers, namely above the ascending blown film. However, a heating for the film is not provided there. The specification rather describes the stretching section as a "cold orientation zone". In addition, no mechanical treatment occurs above the eventual pair of haul-off rollers. Instead, the blown film is immediately diverted into the horizontal direction by way of a deflecting roller and then guided further downwards.

DT 1 504 461 provides an inner mandrel for heating up the film tube. The first pair of haul-off rollers does not close. The stretching after the first pair of haul-off rollers is implemented by means of an overpressure flowing through it.

In AT 267 160, the blown film is embossed within the pair of haul-off rollers.

AT 342 292 provides that the film tube is guided through a series of infrared radiators, which increase the temperature of the film tube up to the temperature required for stretching. The film tube is then stretched in the transverse direction to the extrusion direction by introducing pressurized air into it through a conduit and is simultaneously stretched in its longitudinal direction by means that are not shown, which cause an airtight closure of the tube and which haul-off the film tube at a speed that is greater than the speed with which it is transported by pinch rollers. The means for the longitudinal stretching, which are precisely not shown, are the haul-off rollers in the sense of the present invention, beyond which apparently no further processing is intended. In addition, extrusion in the installation according to this specification occurs in a top to bottom direction so that it cannot use the advantage of the ascending heat as well as in the present invention.

CH 432 815 also deals with the structure of the installation upstream of the pair of haul-off rollers but not with its design beyond the pair of haul-off rollers.

The same applies to CH 475 082.

DE 21 32 259 C3 describes a rather remote prior art.

DE 102 42 174 A1 describes a conventional blown film installation, wherein the longitudinal stretching factor, respectively the inflation factor are to be adjusted by means of the ratio between the circumferential speed of the squeezing rollers and the inner pressure.

U.S. Pat. No. 6,447,278 B1 discloses a lateral guidance of the double layer film strip immediately after the pair of haul-off rollers.

U.S. Pat. No. 4,086,045 again shows a cast film installation, which thus isn't very relevant here, because there is no processing above the heat ascending from the extruder.

U.S. Pat. No. 3,768,949 shows an early embodiment of a reversing unit, wherein the film tube is hauled off by two individual rollers, which do not press against each other but which still form a pair of haul-off rollers in the broader sense.

U.S. Pat. No. 3,340,565 shows rotatable cooling rollers allowing for a continuous adjustment of the cooling time.

U.S. Pat. No. 3,116,787 again shows a cast film installation, which is part of a remote prior art since it does not include processing steps above the heated extruder.

U.S. Pat. No. 4,676,728 provides a reversing unit with vertical reversing bars or rollers. The same applies to U.S. Pat. No. 5,727,723.

In DE 35 08 626 C1 rollers for threading the arriving film tube into the blown film installation when starting up the blown film installation can be driven apart. The reversing bars and the deflecting rollers are then displaced toward each other so that they mesh with each other until they reach an operating position.

In DE 692 08 002 T2 a longitudinal stretching of the film tube also only occurs above a pre-haul-off roller, i.e. not at the pair of haul-off rollers. In addition, a preheating is not provided in the cold orientation zone.

In GB 2 201 371 A a film tube is first rolled off from a roll and then guided upwards above a blown film installation, where it is heated up and then guided vertically downward and inflated in the process and finally taken off and rolled-up again. A heating downstream of the pair of haul-off rollers is not provided nor is there a hot blown film die, so that the heat forming above it is not present and thus not usable.

WO 2005/102666 A1 shows a blown film installation in which either the distance between the pair of pre-haul-off rollers and the pair of haul-off rollers is adjustable by means of a vertical adjusting mechanism or in which a rotating disc with different rollers is provided, wherein, in both cases after the pair of haul-off rollers, the double layer film strip is guided first laterally and then downwards.

Above the processing roller line a reversing bar device can be provided, more specifically within a reversing unit. By a reversing rotation of the reversing bars and/or rolls, the reversing unit ensures a uniform rearrangement of places in the film tube with potentially varying thicknesses for achieving a generally quite uniform winding result on the roll. A reversing unit can be gathered for example from EP 0 673 759 A1.

In the present patent application, a reversing unit should not be seen as a "processing roller line".

A processing roller line additionally includes preferably only rollers, but reversing bars or other means for guiding or deflecting the film are also conceivable.

In addition, a reversing unit does not contain an active heating for the double layer film strip.

According to a second aspect of the present invention, the problem is solved by a blown film installation with an annular nozzle for extruding a film tube, with a film tube formation area for longitudinal and transverse stretching of the film tube, with a cooling means for the film tube moving in the machine direction, with a cooling means for the film tube moving in the machine direction, with a collapsing section for collapsing the film tube into a double layer film strip and with a pair of haul-off rollers beyond the cooling means for hauling off the film tube, wherein a processing roller line is provided for the double layer film strip beyond the pair of haul-off rollers for longitudinally stretching the double layer film strip, if required with a heating means, wherein the processing roller line comprises a first stretching roller and a second stretching roller following the first stretching roller, wherein the pair of haul-off rollers is adapted to be driven at a haul-off roller speed and wherein the second stretching roller is adapted to be driven with a stretching speed which is higher than the haul-off roller speed and the speed of the first stretching roller, so that during operation of the blown film installation, the double layer film strip is stretched in the machine direction between the first and the second stretching roller, wherein the blown film installation is characterized in that a breakdown brake impeding a penetration of a tractive force from the second stretching roller to the pair of haul-off rollers is provided within the processing roller line upstream and/or on the first stretching roller.

It must be explained that due to its higher circumferential speed the second stretching roller exerts a tensile force onto the double layer film strip running towards it. In a quasi stationary production process, this tensile force follows the "actio=reactio" principle. Therefore, a bearing for absorbing this tensile force must be provided in the opposite direction to the machine direction of the stretching roller. In the prior art according to DT 2 146 266 the pair of haul-off rollers formed this bearing. The present invention however is based on the finding that this does not bring out the maximum potential of a blown film installation by far. Indeed, in order to be able to absorb the tensile force of the fast moving stretching roller, the pressing force of the haul-off rollers against each other must be quite high. However, the issue of whether the two film layers will be welded together in the nip of the haul-off rollers or not, depends not only on the temperature but also on the pressure with which the two film strips are pressed together in the nip. Thus, if the pressing force of the nip is increased in order to be able to absorb the tensile force from the fast moving stretching roller, the film must correspondingly be moved through the nip of the haul-off rollers at a lower temperature. On the other hand, if, according to the present invention, the breakdown brake is installed between (if necessary the first, but in any case the second) stretching roller moving faster than the haul-off roller, the tensile force from the stretching section arriving on the haul-off rollers is reduced or even eliminated. The pressing force of the two haul-off rollers in the nip of the haul-off rollers can be set to a minimum and ideally merely needs to be dimensioned based on the parameters reigning upstream of the pair of haul-off rollers in the machine direction. Ideally, no tensile force from the stretching section should reach and be borne at the pair of haul-off rollers.

Several measures are suitable as "breakdown brakes". Simple passive rolls should not fall in this category but rather one of the following three concrete implementations:

Thus, as a first of the three concrete variants, the tensile force breakdown brake, or the tensile force reach through brake, can have a speed-regulated holding roller. This must be understood as a roller whose speed is adjustable in a continuous or gradual manner, wherein the speed of a roller always refers to the circumferential speed. This means more specifically that the speed of the holding roller must be adjustable in relation to the speed of the second stretching roller.

The holding roller can be the first stretching roller but can also be disposed upstream of the first stretching roller.

A preferred embodiment provides that the holding roller is disposed directly above the pair of haul-off rollers and that it is followed by the first and second stretching rollers. In such an embodiment, the first stretching roller can be either passive or it can be set to move slower than the second stretching roller, particularly at least at approximately the same speed as the pair of haul-off rollers.

A second concrete variant can be that the tensile force breakdown brake, or the tensile force reach through brake, comprises a pressing roller. A pressing roller makes a slipping of the double layer film strip around the surface of the roller more difficult. Thus, in a preferred embodiment a pressing roller can engage with the holding roller. In this constellation of the particularly preferred embodiment, the holding roller is also the first roller of the processing roller line and/or the last roller upstream of the stretching roller.

The third concrete variant provides that the tensile force breakdown brake, or tensile force reach through brake, has a wrap angle guide for wrapping a first roller in the processing roller line of at least 160°, preferably at least 180°. The first roller is preferably the holding roller. It is also conceivable to provide an optional heating roller as an alternative for the holding roller, said heating roller being preferably disposed laterally at a distance from the series of rollers formed by the holding roller and the two stretching rollers, so that a film strip can be heated from two sides, namely first on a first side of the optional heating roller and then on its second side from the holding roller, which can concurrently be configured as a heating roller, which has an advantageous effect particularly with thicker films.

In order to achieve a lower construction height of the blown film line it may be advantageous to provide a transverse orientation of the rollers of the processing roller line, wherein a transverse orientation should be provided when the double layer film strip runs more horizontally than vertically. This applies more specifically to an at least substantially horizontally running double layer film strip. Given the fact that the film strip runs around rollers and reversing bars, its course can be defined by the actual film run and/or by the position of the rotational axes of two rollers or reversing bars relative to each other.

More specifically, the connecting path between two, three, four, five, six or several rollers runs more horizontally than vertically, either without exception or with a few exceptions located between them.

Particularly preferably two, three, four, five, six or several rollers should be disposed horizontally relative to each other.

It is admittedly already known from U.S. Pat. No. 6,413,346 B1 to provide a processing roller line with several pairs of rollers and stretching sections disposed in between them, which run transversely to the vertical extrusion direction. The pairs of rollers provided therein are however positioned exactly horizontally sideways of the pair of haul-off rollers and subsequently lead further downward to a winder. A reversing bar unit is not disclosed in that specification. It therefore makes sense therein to guide the film strip sideways because it ultimately needs to be led downwards.

If the specification did provide a reversing unit above the pair of haul-off rollers, the film would have to arrive again above the haul-off rollers after the processing roller line. Until know, this notion kept designing engineers from guiding the film strip transversely, much less horizontally, on the—already quite short—section between the haul-off and the reversing section. This is because the film strip must be led back along each path section around which it is laterally guided, which requires a plurality of rollers.

The present aspect is based on the finding that it can sometimes make sense to provide a greater number of rollers and/or reversing bars in a processing roller line. A blown film installation with a reversing unit has however a considerably lower construction height when the plurality of rollers of the processing roller line between the haul-off and the reversing unit are disposed as horizontally as possible. The lesser construction height implies a lesser hall height, which comes with considerable cost savings.

The processing roller line can comprise a temperature closed loop control, which lets the heating means heat up the double layer film strip at the entrance to the processing roller line by less than 80 K, preferably by less than 30 K.

It does not matter whether the control system measures the current temperature for example on the double layer film strip or on the surface of the roller when a heating roller is used. In practice, a variant is preferred in which the temperature of a fluid return line from the roller is measured.

In theory, the control system can also work without a temperature sensor, because since the temperature gradient of the melt ascending between the blown film die and the haul-off is given, the temperature at which the double layer film strip enters the processing roller line is relatively precisely known.

The important point regarding the heating means in the processing roller line is providing a heat-up that however only slightly exceeds the temperature of the incoming double layer film strip.

In general, it must be pointed out that the temperature information given in the present patent application must be understood as technical median temperatures. In practice the temperatures vary along the length of a roller, i.e. along the width of the film strip, mostly by 1 to 4 K.

Thus the energy balance of the blown film installation can be optimized: the cooling of the film tube pulled upwards is adjusted in such a manner that it has cooled down just enough upon reaching the calibration cage and the haul-off rollers; it then runs through the mechanically critical spot at the haul-off roller and subsequently only needs to be very slightly heated up again in order to be easily stretchable.

Polypropylene can for instance be used for the films. During the endothermic process, i.e. during melting and blowing, melting occurs at about 160° C. to 168° C. During the ascension, i.e. during the cooling of the film, crystallization occurs at about 115° C. to 135° C. Below that temperature, the double layer film strip can be safely squeezed, and thus stretched, by the pair of haul-off rollers. After the pair of haul-off rollers, a heating by e.g. 10 K to 50 K is already enough to bring the film to a temperature that is not the melting point but that allows for a safe stretching of the film strip.

Assuming for example that the room air temperature $T_U$ amounts to about 30° C. at the site of a blown film installation. In that case, in customary installations, the film strip reaches the stretching installation at about 30° C., for the most part with a slightly higher temperature. Due to the strong air movement at the surface of the film strip—caused by the fast forward movement of the film strip—a fast drop of the film temperature can generally be observed as soon as the film strip is guided laterally away after passing through the haul-off. Indeed, for the most part, the double layer film strip has a temperature of between about 60° C. and about 80° C. at the haul-off.

If the planned stretching process is implemented in a flattening package, temperatures of 80° C. are sufficient. For the most part, temperatures around 85° C. are sufficient for a pre-stretching process in a MDO. And in order to implement a stretching in a MDO, the temperatures in the film strip should range from 100° C. to 105° C. for polyethylene, from 130° C. to 140° C. for polypropylene, and about 70° C. for polyamide. Thus, depending on the application, a heating of only a few K directly after the haul-off is sufficient, or the temperature can merely be maintained, which is also made possible by a heating means.

In a particularly preferred embodiment, the processing roller line comprises a heating roller for heating the double layer film strip for a better processing in the processing roller line.

A heating roller is a roller, which mechanically engages with the double layer film strip during operation of the blown film installation. The blown film strip rests on the heating roller along a pre-determined section of the roller surface, which is given by the wrap angle. The heat flow from the heating roller to the film is particularly good during this contact phase.

The heating roller itself is preferably configured as an active heating means on the inside, for example as close as possible to the surface.

It can be provided that a heating roller is setup to generate a segmented temperature profile along its roller length. The heating roller can for example be segmented into two, three, four or more segments. Different heating fluids for example can flow through the individual segments or active heating means can be provided in or on the roller. If the roller can generate a segmented temperature profile, the film can be impinged with a targeted temperature profile.

A heating station for the double layer film strip can also be configured in another way than with a heating roller, for example with a heating section with heat radiators.

A similar idea can be applied to all subsequent types of "rollers", which should respectively only be understood as—albeit preferred—examples of "stations".

The heating station, i.e. mainly the heating roller, preferably has a temperature sensor, in order to be adjustable within a fixed temperature interval. This temperature interval should be adjustable in such a manner that the resulting temperature of the double layer film strip leaving the heating station lies less than 50 K, preferably less than 30 K or 20 K above that of the arriving double layer film strip.

Three examples to illustrate this:

In a flattening package in the processing film line, the arrival temperature of the double layer film strip can for example amount to 60° C., i.e. a common temperature at the pair of haul-off rollers. If a temperature of 80° C. is desired for the stretching process in the flattening package, the heating station must heat the double layer film strip by only about 20 K. Compared to a customary installation in which the double layer film strip is for example first stretched at the floor level of the hall, i.e. with an arrival temperature at the flattening package of about 30° C., which requires a heating of about 50 K, the energy amount required for heating up by 30 K is saved.

It is proposed that the temperature increase of the double layer film strip when running off the heating roller lies between plus 5 K and plus 80 K; preferred values lie between
 a. plus 5 K and plus 20 K for a flattening package, especially with a departure temperature of about 80° C.;
 b. plus 5 K and plus 25 K for a pre-stretching, especially with a departure temperature of 85° C.

It is proposed that the processing roller section has a stretching section for a longitudinal stretching of the double layer film strip.

It has already been mentioned earlier that a stretching section is constructively implemented by first providing a holding roller or another holding means in the machine direction, the stretching section then having a stretching roller on a downstream side of the machine direction, or, as explained above, a pair of stretching rollers, for a faster transport of the double layer film strip than on the holding roller.

For example, when the holding roller and the stretching roller have the same diameter, the rotational speed of the stretching roller can be set higher and the rotational speed of the holding roller can be set lower. In both cases, the important point is the value of the circumferential speed. Depending on how the film runs through the processing film line, a stretching section can be achieved with rollers running with the same orientation as well as with rollers running with opposite orientations. If the film crosses the direct connection between the two roller axes inside the stretching section, the rollers must run in the opposite direction, if not, in the same rotational direction.

A "stretching" ratio in the stretching section lies preferably between 1:2 and 1:4, more specifically rather 1:2 for pre-stretch films for agricultural applications. A stretching ratio in the stretching section of 1:2 to 1:10 must generally be seen as advantageous, but more specifically the previously mentioned range of 1:2 to 1:4.

An "extension" ratio inside the stretching section is higher than 1:1 but preferably only up to 1:1,05.

The holding roller can preferably fulfil two functions, i.e. for example be embodied by a heating roller or by any other type of heating station.

In general, it must be pointed out that, in the present invention, the indefinite numerals "one", "two", etc. must not be understood as "exactly one", "exactly two", etc. but normally as indefinite articles. A statement such as "one . . . ", "two . . . ", etc. must therefore be understood as "at least one . . . ", "at least two . . . ", etc., provided the context does not indicate that "exactly one", "exactly two" etc. is precisely what is meant.

In a particularly wide conception of the invention, the haul-off roller, respectively the pair of haul-off rollers, ideally in form of a pair of squeezing rollers, can form the heating means and possibly even simultaneously serve as holding rollers. As a rule, this would however lead to a downgraded embodiment, because a heated haul-off roller bears the risk of heating the film too much while it is still being mechanically drawn so that it may be uncontrollably damaged. Ultimately, the pair of haul-off rollers naturally also indirectly serves as a holding mechanism for the processing roller line because it provides a defined and rather narrow speed range. For the reasons described above, it is however preferable if at least one roller moving slower than the stretching roller is provided as a holding roller between the pair of haul-off rollers and the much faster stretching roller.

The stretching section or the stretching length as such can ideally have a maximum length of 120 cm, more specifically a maximum length of 50 cm or 15 cm, particularly a maximum length of 10 cm or 5 cm.

Tests implemented by the inventors have shown that a stretching section that is as short as possible is advantageous in order to limit a transverse constriction of the double layer film strip as much as possible. On the other hand, the threading of the double layer film strip during start-up of the installation is made considerably easier if there is a gap of at least 5 cm between the rollers of the processing roller line. It is then easier to thread the end of the film between the rollers.

It is preferable if at least one of the rollers forming the processing roller line is displaceable or pivotable away from its position in order to facilitate the threading. This principle can be adopted without an inventive step from U.S. Pat. No. 4,086,045.

It is proposed that the processing roller line has a tempering roller or a pair of tempering rollers or an otherwise configured tempering station for releasing the tensions in the double layer film strip after stretching.

Prototype tests of the inventor have shown that a memory effect of the film stretched in the machine direction in the stretching section can be considerably reduced if the stretching section is followed by a second active heating device, more specifically in form of a tempering station with a tempering roller.

The first tempering roller can also be formed by the stretching roller, and/or one or several separate tempering rollers can be provided.

In the tempering section, the double layer film strip can be receive a temperature increase between minus 5 K and plus 30 K, preferably between plus/minus 0 K and plus 20 K, respectively relative to the temperature of the double layer film strip in the stretching area.

At the same time, the stretching roller is particularly preferably configured as the first tempering roller and may be followed by a first or even a second other tempering roller.

Several tempering rollers preferably have the same temperature setting, i.e. are adjusted in such a manner that they provide the double layer film strip with the same temperature during operation. In practice this adjustment is for example easily implemented by means of a return line of heating fluid set to the same temperature—whilst accepting deviations.

The idea of "the same temperature setting" is also implemented if successive rollers apply slightly different temperatures to the double layer film strip, more specifically with a fluctuation range of plus/minus 5 K or plus/minus 10 K.

It can be preferable to generate a targeted increasing or decreasing temperature cascade in the double layer film strip by means of the heating and/or tempering rollers.

Generally each station, i.e. particularly the heating station, tempering station and cooling station can have several rollers, which the double layer film strip needs to run through successively. That way, the adjustment of the film temperature to the desired values is facilitated.

Finally, it is proposed that the processing roller line has a cooling station for the double layer film strip, more specifically a cooling roller, in particular with an active cooling means.

In the previously mentioned temperature cascade, it is proposed that the cooling station of the double layer film strip applies a temperature change between minus 5 K and minus 80 K, more specifically between minus 10 K and minus 20 K, more specifically to approximately 60° C. and/or approximately to room temperature and/or to approximately 40° C. to 60° C. A potentially provided reversing can also be safely implemented at film temperatures of about 60° C.

A cooling roller can be considered as a cooling roller even if it does not have an active cooling means. However, it preferably comprises an active cooling means.

A cooling roller can more specifically explicitly include a heat dissipation means, for example by way of a water circuit or another fluid circuit for a cooling means, which is introduced into the cooling roller and back out of the cooling roller by means of a conduit.

In a preferred embodiment, a heat exchanger, an electrically driven fluid pump and/or a cold pump are integrated into the circuit and connected to the cooling roller.

The processing roller line can advantageously have a closed loop control for improving a flattening, wherein a longitudinal extension of 0.5% to 5% of the double layer film strip is implemented.

The processing roller line can alternately have a closed loop control for a longitudinal stretching of the double layer film strip by more than 5%, preferably more than 100% or more than 500%. Data for a possible configuration of a stretching section, i.e. as an MDO, has already been given earlier, with a stretching ratio within the stretching section of ideally 1:2 to 1:10 and/or with a stretching ratio from the holding roller to the cooling roller of ideally 1:2 to 1:4.

Possible temperature gradients between the process temperatures of the double layer film strip at the rollers or at differently configured stations in the processing roller line were already given earlier.

Independently of the previously mentioned other marginal conditions, it is proposed that the processing roller line has a heating roller for the double layer film strip with a temperature gradient of plus/minus 0 K or of plus 1 K to plus 80 K, or more in the case of fast moving double layer film strips, more specifically made of polypropylene, more specifically relative to the previous station in the machine direction and/or the roller temperature of the haul-off roller.

Alternately and cumulatively, it is proposed that the processing roller line has a stretching roller for the double layer film strip with a temperature gradient of minus 10 K, preferably of plus 5 K to plus 30 K or of plus 50 K, or more in the case of fast moving double layer film strips, as compared to the previous station in the machine direction.

Alternately and cumulatively, it is proposed that the processing roller line has a tempering roller for the double layer film strip with a temperature gradient of minus 10 K, preferably of plus 5 K to plus 30 K or of plus 50 K, or more in the case of fast moving double layer film strips, as compared to the previous station in the machine direction.

Alternately or cumulatively it is proposed that the processing roller line has a cooling roller for the double layer film strip with a temperature gradient of minus 10 K to minus 80 K, or minus 100 K in the case of fast moving double layer film strips, as compared to the previous station in the machine direction.

In order for the build of the complete installation to be as flat as possible, more specifically when a reversing unit is disposed above it, it is proposed that the processing roller line has two transversely oriented partial sections in the course of the double layer film strip, preferably three transversely oriented partial sections, more specifically respectively spanning a vertically ascending direction above the pair of haul-off rollers.

Regarding a "transverse" orientation, it has already been explained earlier that one may already speak of such an orientation when, in a lateral view onto the rollers, i.e. parallel to the orientation of the rotational axis of the rollers, the direct connection between two successive rollers is more horizontal than vertical, i.e. has an orientation of maximally 45° relative to the horizontal, preferably maximally 30°, particularly preferably maximally 15°, 10° or 5°.

The decisive factor for the construction height is not so much the course of the film as the arrangement of the individual rollers. Depending on the given arrangement of the rollers, the course of the film can be designed to run around the one or the other side, without however taking up much construction height due to its practically negligible thickness.

It can also be advantageous if, in the transversely disposed partial sections, the film lies less horizontally than the connection between the two roller axes.

The previously described feature according to which a partial section spans a vertical ascending direction above the pair of haul-off rollers must be understood in such a manner that the path of the film provided between the two successive rollers crosses the virtual vertically disposed plane located above the nip of the pair of haul-off rollers.

In such an arrangement, rollers are disposed above the pair of haul-off rollers on both sides of the vertically ascending plane, wherein the film runs across both sides, preferably back and forth, so that a relatively long film course in the processing roller line is achieved while preserving a low construction height.

A preferred embodiment of the invention provides that the processing roller line comprises three partial sections having the same transverse orientation, more specifically spanning a vertical ascending direction above the pair of haul-off rollers only once.

In such a configuration, four rollers, for example, are disposed at least substantially in a line, namely in a line running transversely to the ascending direction, preferably almost or exactly horizontally.

The processing roller line may have a threading aid with a displaceable or pivotable roller for threading the film. This has already been explained. The meshing depth is preferably adjustable as desired, i.e. ideally electronically inputtable by way of a control system of the installation.

It must be explicitly pointed out that transverse stretching means can be provided in addition to the means for longitudinal stretching of the double layer film strip, for example with guide tracks disposed in a diverging manner, in which singular grippers such as grippers or needles are disposed, which ultimately pull the film strip transversely to the machine direction.

According to a third aspect of the invention, the problem is solved by a method for manufacturing a blown film line in a blown film installation, particularly in a blown film installation as described above, with the following steps:
Extrusion of a film tube;
Blowing of the film tube in a tube forming area for transverse stretching of the film tube;
Cooling of the ascending film tube with a cooling means;
Flattening of the film tube to form a double layer film strip by means of a collapsing unit;
Haul-off of the double layer film strip by means of a pair of haul-off rollers while longitudinally stretching the film tube;
wherein the method is characterized by the further steps of:
Guiding the double layer film strip upwards above the pair of haul-off rollers and through a processing roller line with a heating means for heating up the double layer film strip; and
Treating the double layer film strip in the processing roller line, more specifically stretching the double layer film strip in a stretching section of the processing roller line and/or
Guiding the double layer film strip inside the processing roller line around a first stretching roller and around a second stretching roller following the first stretching roller,
wherein the pair of haul-off rollers are driven at a haul-off roller speed and wherein the second stretching roller is driven at a stretching speed which is higher than the haul-off roller speed and than the speed of the first stretching roller so that, during the operation of the blown film installation (1), the double layer film strip is stretched between the first and the second stretching roller in the machine direction,
wherein a breakdown brake, which impedes a penetration of a tractive force from the second stretching roller to the pair of haul-off rollers, is provided within the processing roller line upstream of and/or on the first stretching roller, so that the breakdown break forms a bearing for receiving the tractive force.

It has already been explained earlier that these processing steps are highly advantageous. Since the film in the form of a double layer film strip is moved further upwards above the haul-off rollers, a long guiding of the film is dispensed with, so that a further cooling of the film after the haul-off rollers, which absorbs a lot of energy, is avoided.

Thus, the film can be brought from its initial temperature to a temperature level better adapted for further processing by adding only little additional energy, and can then be for example stretched, more specifically extended or stretched or otherwise processed; for instance the surface can be treated and/or the film can be embossed and/or components can be glued or inlaid, such as for example active or passive oscillator circuits, often referred to as RFID chips, and/or the film can be irradiated, and/or the film can be laminated, and/or the surface can be subjected to a corona treatment and/or the film can be embossed and/or a glue can be applied and/or a lubricant can be applied and/or an anti-fogging coating can be applied and/or a targeted tempering of the double layer film strip can be implemented for supporting the migration of additives, if additives are to travel to the surface of the film and act there so that a downstream tempering or bearing can be dispensed with, wherein the migration is substantially a function of the temperature.

Additionally or alternately a targeted manipulation of shrink values of the film can be implemented. The shrinkage after the stretching can be reduced by sufficiently long tempering to the point where a so-called "dead film" without shrinkage is provided. Alternately an increase of shrink values can also be achieved, more specifically of the shrinkage values in the machine direction, by way of a targeted "freezing" of tensions.

Additionally or alternately, a targeted adjustment of the curling to the point of avoiding a curling in asymmetric film structures is implemented.

In the previously mentioned applications, the method and the blown film installation can be advantageously used in a targeted manner.

One or several rollers of the processing roller line can be displaced or pivoted away from their operating position for threading the double layer film strip and the double layer film strip can be tensioned after the threading by a returning displacement or returning pivoting.

Finally, according to a fourth aspect of the invention, the problem is solved by a film manufactured by way of a blown film installation and/or by means of a method as previously described.

The installation as well as the method have a noticeable and reproducible impact on the finished film in that it leads to a particularly homogeneously biaxially stretched film when the already hot molecules are immediately re-heated and then stretched instead of letting them first cool down.

If the film is first cooled down, it naturally needs to be heated up to the desired high temperature range—in order to let the blown film installation operate efficiently—which leads to the previously described not uniformly predictable film properties.

The quality of the film product produced with the proposed method is therefore also verifiably advantageous, provided that the parameters of the blown film production have been set in accordance with the present invention.

Figure 2:
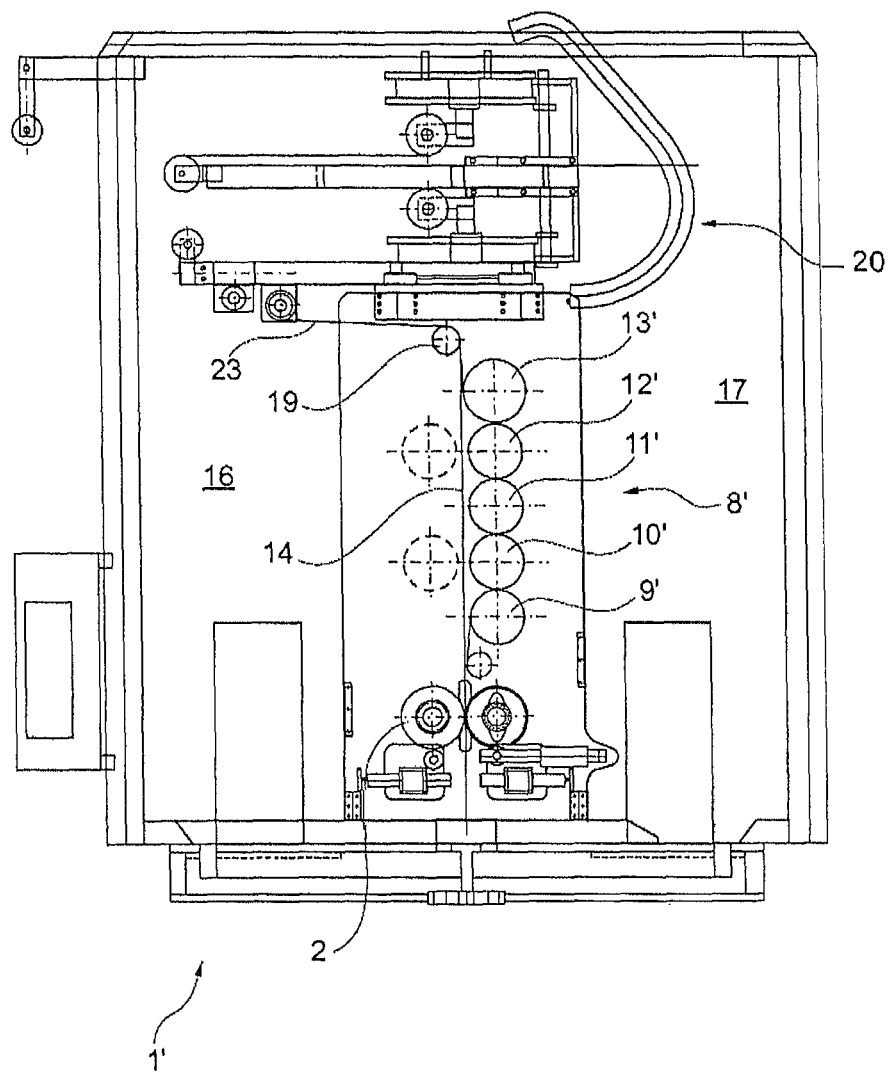
Figure 3:
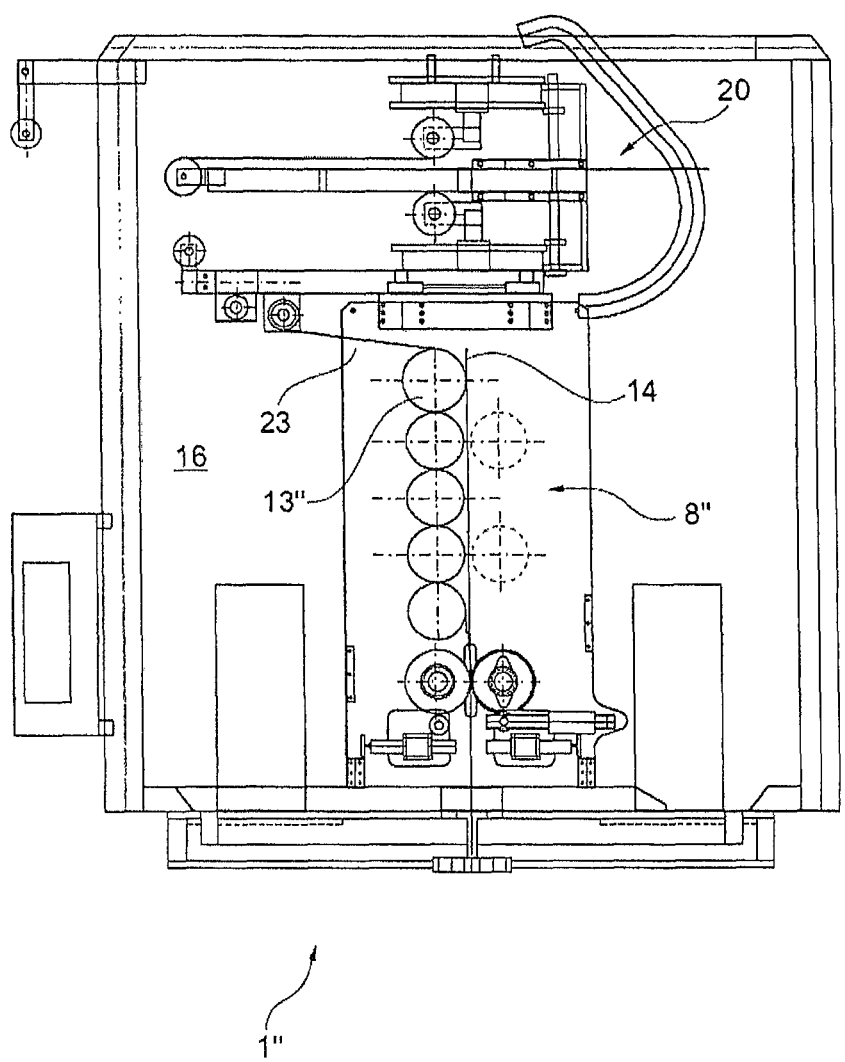
Figure 4:
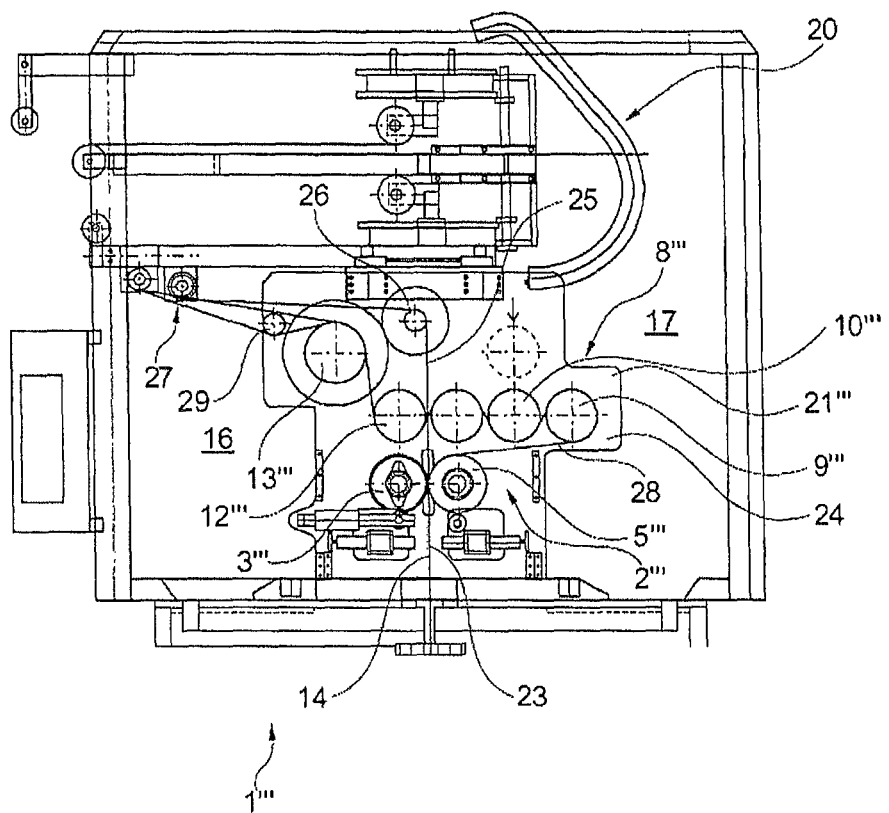
Figure 5:
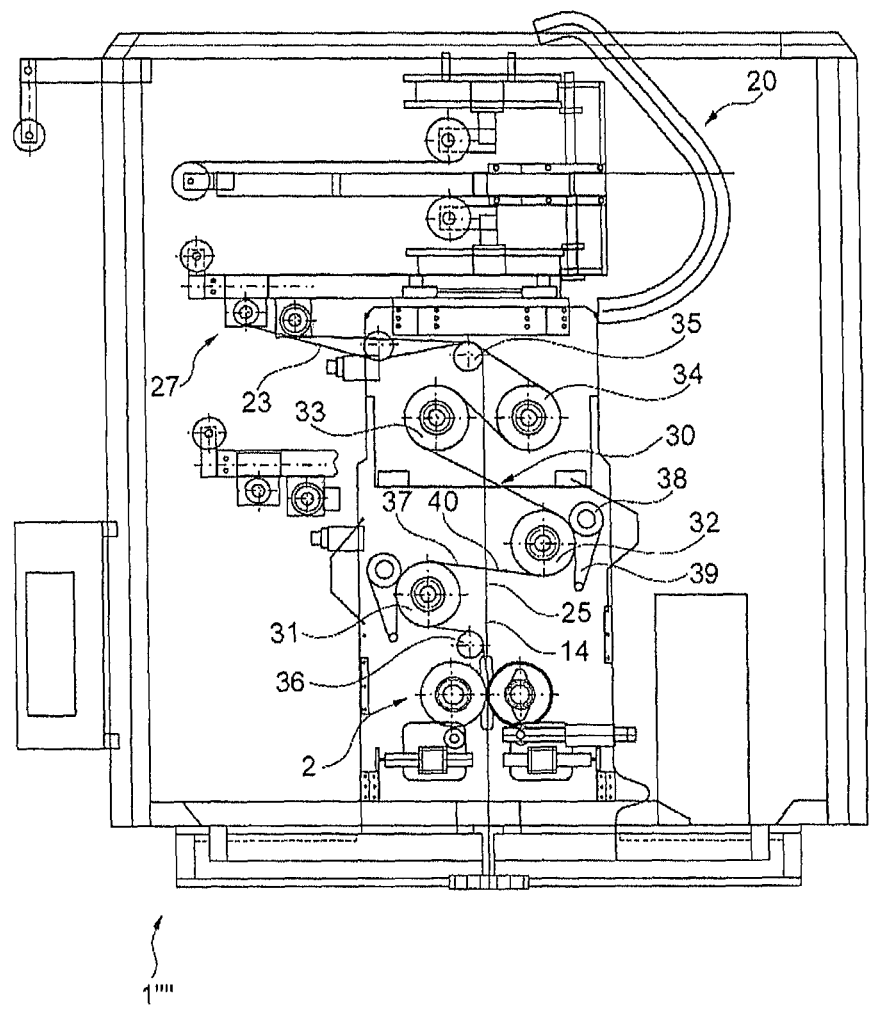
Figure 6:
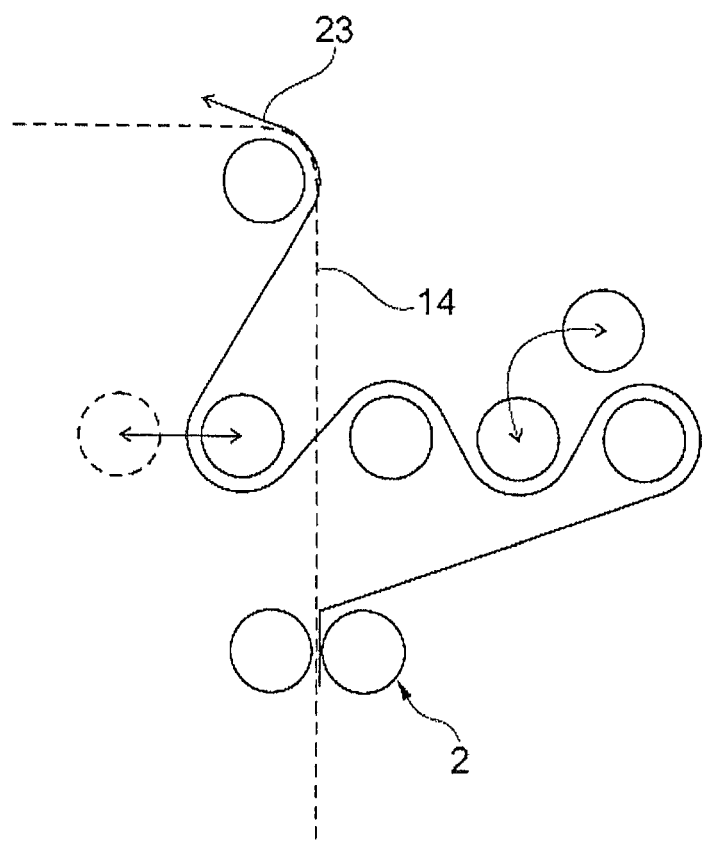

In the following, the invention is described in more detail based on six exemplary embodiments with reference to the drawings:

FIG. 1 schematically shows a vertical section perpendicular to a pair of haul-off rollers through a first variant of a processing roller line with five rollers and a reversing unit disposed above it, FIG. 2 shows the same view as in FIG. 1 onto a second variant of a processing roller line with five rollers and a reversing unit disposed above it, FIG. 3 shows the same view as in FIG. 1 onto a third variant of a processing roller line with five rollers and a reversing unit disposed above it, FIG. 4 schematically shows a vertical section through a pair of haul-off rollers of a fourth variant of a processing roller line with five rollers and a reversing unit disposed above it, having a lesser construction height, more specifically as an embodiment for a MDO unit, FIG. 5 schematically shows a vertical section through a pair of haul-off rollers of a fifth variant of a processing roller line with four rollers and a reversing unit disposed above it, more specifically as an embodiment for a flattening package, and FIG. 6 schematically shows a possible sixth variant of a processing roller line with a construction height that is as small as possible.

Figure 7:
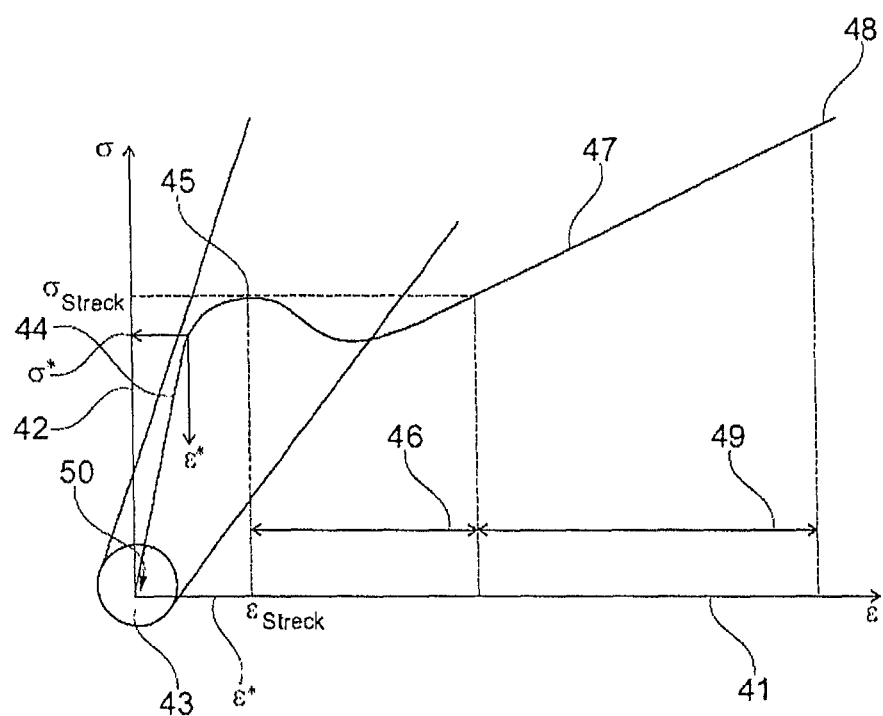
Figure 8:
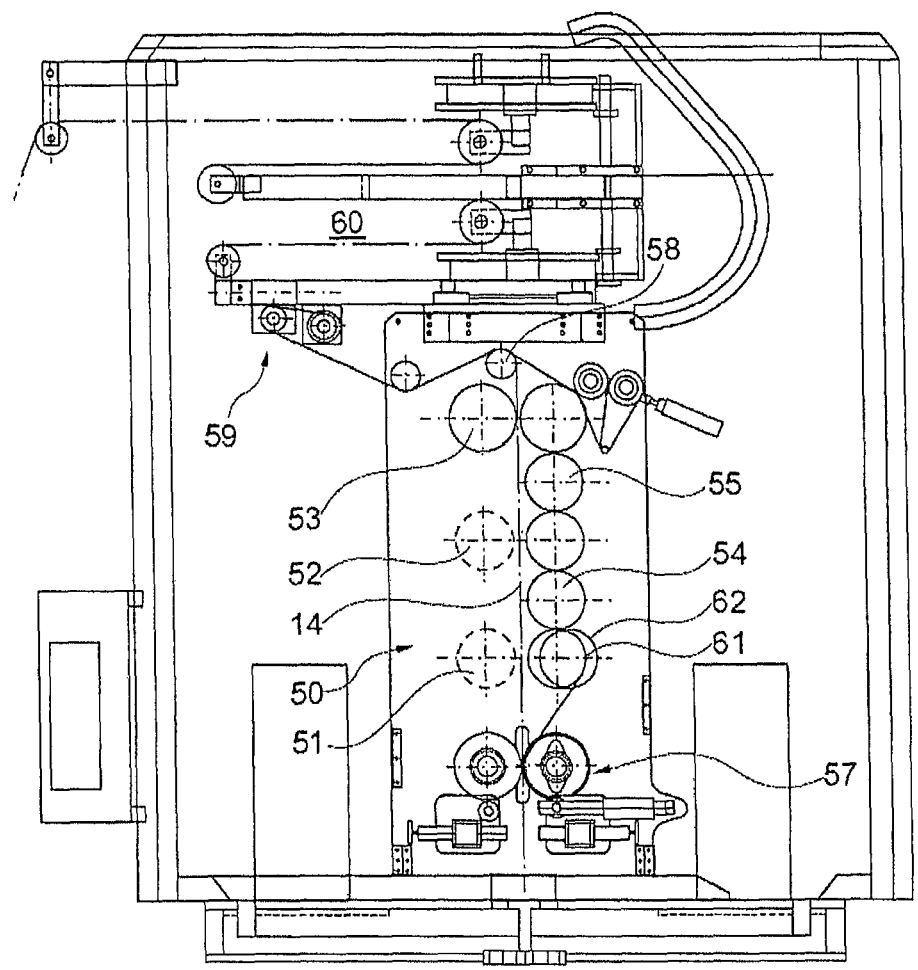
Figure 9:
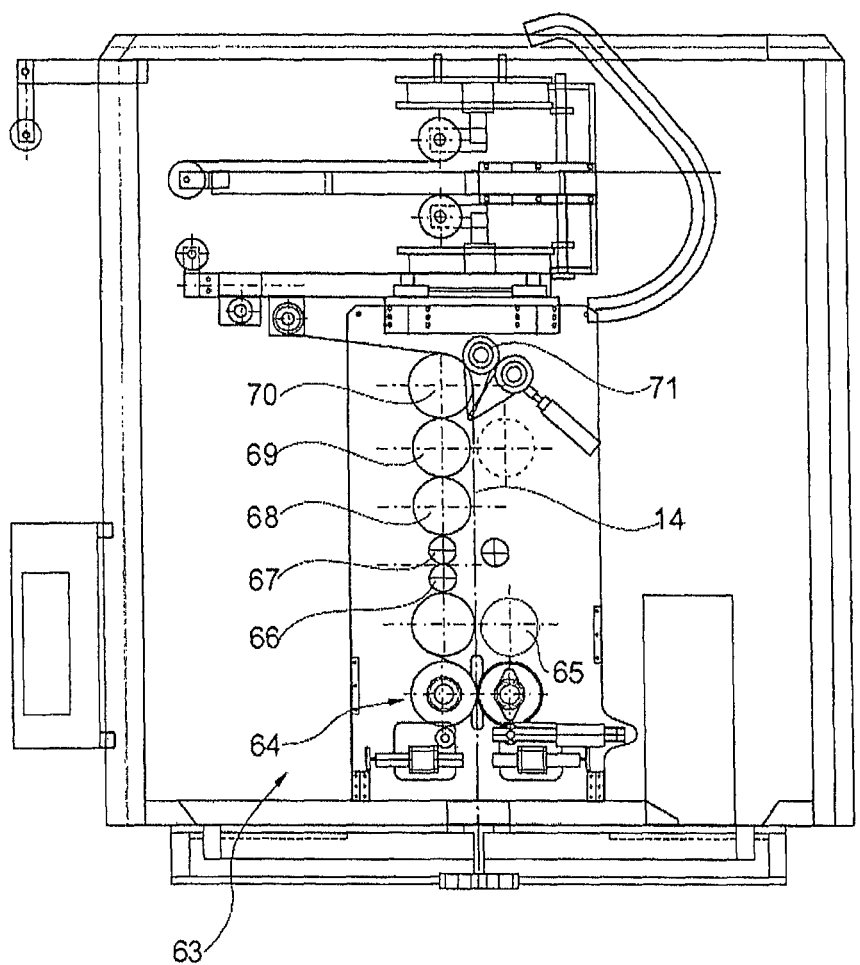

FIG. 7 shows a diagram regarding the development of the longitudinal tension 45 as a function of a longitudinal extension c of a plastic film, FIG. 8 schematically shows a vertical section through a pair of haul-off rollers of a sixth variant of a processing roller line with five rollers and a reversing unit disposed above it, and FIG. 9 schematically shows a vertical section plane through a pair of haul-off rollers of a seventh variant of a processing roller line with six rollers for four processing stations and with a reversing unit disposed above it.

The blown film installation 1 (only its upper area is shown) in FIG. 1 consists substantially of an extruder, a blown film die with an annular nozzle, an ascending section disposed above it for an extruded film tube, a calibration cage, a collapsing unit and a pair of haul-off rollers 2 above the collapsing unit, wherein a first haul-off roller 3 is held by a first holder 4 and its position is finely adjustable, whereas a second haul-off roller 5 is mounted on a sliding bearing support 7 in such a manner that it is horizontally displaceable by an adjusting cylinder 6. The adjusting cylinder 6 can thus horizontally move the second haul-off roller 5 toward and away from the first haul-off roller 3.

A processing roller line 8 is provided above the pair of haul-off roller 2. A total of five rollers, namely a first roller 9, a second roller 10, a third roller 11, a fourth roller 12 and a fifth roller 13 are located there.

The five rollers of the processing roller line 8 are alternately disposed on different sides of a virtual plane 14, which lies parallel to central axes 15 (exemplarily labeled) of the two haul-off rollers and runs vertically through the nip of the two haul-off rollers. The virtual plane contains a surface, which the flattened film would have to cross if the flattened film coming out of the nip of the haul-off rollers would simply rise vertically upwards. In a vertical section perpendicular to the central axes 15, the virtual plane 14 is therefore represented as a vertically running line, namely beginning at the nip of the pair of haul-off rollers and following the vertical direction of ascension of the film.

The first roller 9, the third roller 11 and the fifth roller 13 are located on a first side 16 of the virtual plane 14; the second roller 10 and the fourth roller 12 on the other hand are located on an opposite second side 17 of the virtual plane 14.

At the same time, all five rollers of the processing roller line 8 are vertically placed so close to each other, that a horizontal projection of the rollers onto the virtual plane 14 results in a respective overlap of the first roller 9 with the second roller 10, the second roller 10 with the third roller 11, the third roller 11 with the fourth roller 12 and the fourth roller 12 with the fifth roller 13, namely respectively by a third of the total diameter of the five rollers.

The first four rollers 9, 10, 11, 12 of the processing roller line 8 have the same size, whereas the two haul-off rollers 3, 5 of the pair of haul-off rollers 2 and the fifth roller 13 are larger.

The distances 18 (exemplarily labeled) between the five rollers of the processing roller line 8 respectively amount to at least 50 mm.

The first roller 9 is equipped with a speed regulator, so that its surface speed can be adjusted quite precisely to a given amount during rotation.

The second roller 10 is equipped with a drive and a closed loop control, which are able to adjust the second roller 10 to a significantly higher circumferential speed than the first roller 9.

The third and fourth roller 11, 12 can be drivable, in which case they are driven for example at the same speed as the second roller 10 or preferably slower than the second roller 10.

The fifth roller 13 can also be drivable, for example at least substantially at the same speed as the fourth roller 12 or preferably slower than the fourth roller 12.

It must be pointed out that it can be advantageous to slow down after a stretching in order to let the tensions in the film dissipate.

The first roller 9 is furthermore equipped with an active heating means and a temperature sensor (both not shown), namely a piping for a heating fluid with a heat conducting connection to the surface of the first roller 9, while the temperature sensor can measure either the surface temperature of the first roller 9 and/or of the moving double layer film strip by way of a contactless measurement.

The temperature sensor is preferably disposed in a return pipe of the heating fluid, so that, while accepting a certain imprecision, it can be assumed that the film will run off at a slightly cooler temperature than the return temperature of the heating fluid.

The exiting temperature of the double layer film strip corresponds ideally exactly to the temperature of the roller surface. In practice however, as the film moves away, it will be slightly warmer or cooler, depending on whether it has been cooled down or heated up by the roller.

In order to implement a particularly precise embodiment, the person skilled in the art can measure the exiting temperatures of the film at each individual roller, for example contact-free by way of an infrared sensor, and adjust the roller temperatures based on the actual film temperatures.

Independently from each other, the second roller 10, the third roller 11 and the fourth roller 12 can respectively also be equipped with such an active heating means.

One roller at any rate, here the fifth roller 13, is equipped with a temperature sensor and an active cooling means.

Two non-driven deflecting rollers 19 (exemplarily labeled) are disposed above the processing roller line 8 on the way toward a reversing unit 20 disposed above the pair of haul-off rollers 2 and the processing roller line 8, wherein the deflecting rollers 19 and the reversing unit 20 are sufficiently known from the prior art and thus do not need to be defined any further.

The two haul-off rollers 3, 5 of the pair of haul-off rollers 2 as well as the five processing rollers of the processing roller line 8 and also the deflecting rollers 19 are borne at their front sides on a machine frame 21.

Two temper devices 22 (exemplarily labeled) are disposed laterally from the machine frame 21. The tempered rollers of the processing roller line 8 are connected with the temper devices 22 by way of coolant conduits, respectively heat medium conduits, preferably also by way of temperature sensor data lines (not shown). Electronic micro controllers (not shown) are also provided in the temper devices 22 or at least have access to the temper devices 22, said micro controllers being able to execute the adjusted control of the temperature of the tempered rollers by means of the fluid return flow.

During operation of the blown film installation 1, a film tube (not shown) is extruded by the extruder (not shown) through the annular nozzle (not shown). The film tube is pulled upward along the blown film installation 1, through the calibration cage (not shown) and the collapsing unit (not shown). At the end of the collapsing unit the film tube is mostly flattened and runs in that form into the pair of haul-off rollers 2. From there on, it must be referred to as a double layer film strip 23.

The double layer film strip 23 can optionally be passed in a straight ascending direction above the pair of haul-off rollers 2, which is congruent with the virtual plane 14, through the rollers 9, 10, 11, 12, 13 of the processing roller line 8 and immediately onto the deflecting rollers 19 and from there led towards the reversing unit 20.

In that case, the blown film installation 1 is a customary blown film installation. During operation of the blown film installation 1, the reversing unit rotates and creates a film wrap that is as uniform as possible on the roll (not shown) on the floor of the installation site (not shown).

In an alternative—and preferred—film conducting line on the other hand, the double layer film strip 23 runs respectively around the five rollers 9, 10, 11, 12, 13 of the processing roller line 8, wherein the geometry of the rollers relative to each other results in a wrap angle of more than 180° at least on the second roller 10, the third roller 11 and the fourth roller 12. The wrap angle of the first roller 9 depends more specifically on the positioning height of the first roller 9 relative to the pair of haul-off rollers 2, as well as on the diameters of the three rollers and moreover on the distance between the first roller 9 and the virtual plane 14. In the embodiment chosen here the wrap angle at the first roller 9 amounts to approximately 170°.

The same applies to the fifth roller 13, the relevant criteria being here more specifically the positioning relative to the virtual plane 14, to the first deflecting roller 19 and the diameter between the fifth roller 13 and the first deflecting roller 19.

In the described configuration, the double layer film strip 23 then runs in the extrusion direction, i.e. in the machine direction, upwards through the pair of haul-off rollers 2 and is then first led around the first roller 9 in a clockwise rotation (indications relative to a clockwise or counter-clockwise rotation are based on the sectional view of the figures). The first roller 9 serves as a holding roller. At the same time, a first of a total of three heat medium or coolant circuits in the processing roller line 8 flows through the first roller 9, namely a heating circuit.

In a configuration of the first variant of the blown film installation 1 according to FIG. 1, the double layer film strip 23 can arrive from the pair of haul-off rollers 2 with a film infeed temperature of about 60° C. to about 80° C.

The first roller 9 is adjusted in such a manner that its circumferential speed is the same as that which the double layer film strip 23 is subjected to at the pair of haul-off rollers 2. Thus the double layer film strip 23 is not subjected to a mechanical manipulation in the gap between the pair of haul-off rollers 2 and the first roller 9.

Due to the high wrap angle of the double layer film strip 23 around the first roller 9, the double layer film strip 23 runs on the first roller 9 with a static friction, i.e. exactly at the same speed as the roller surface, even if the static friction is not provided along the entire wrap angle.

The first temperature circuit, i.e. the heating circuit, which passes through the first roller 9 serving as a holding roller, is for example set to implement a temperature difference in the film of plus 5 K and plus 10 K as compared to the temperature of the film as it exits the previous first haul-off roller 3. The double layer film strip 23 is thus heated up by 5 K to 10 K while running around the first roller 9. This small difference in temperature is already sufficient to significantly increase the processability of the double layer film strip 23 because the blown film installation 1 (below the area shown in FIG. 1) is setup in such a manner that the film is only cooled down during its ascending movement and thus still has a rather high temperature when running through the two haul-off rollers 3, 5, comprised between 60° C. and 80° C. in the tested example.

Based on the initial heat of the film, the temper device 22 can thus very quickly heat the film back up to an easily processible temperature level with only very little energy, in order to facilitate a longitudinal stretching.

In the shown embodiment, the second roller 10 is configured as a stretching roller. In positive tests, it has been driven at three times to four times the circumferential speed of the first roller 9. Stretching ratios around 1:3 resulted film quality that seemed to be adapted for silage pre-stretch films; higher stretching ratios on the other hand, i.e. ratios around 1:4 or more, resulted in a broader processibility, more specifically with regard to the optical quality of the film.

In those positive tests, the second roller 10, i.e. the stretching roller, served as the first of a total of three rollers of a second temperature circuit, namely the tempering circuit. The tempering circuit flows through the second roller 10, the third roller 11 and the fourth roller 12. The temperature in the return conduit of the tempering circuit was set at plus 5 K to plus 20 K as compared to the return conduit of the previous first roller 9, i.e. the holding roller.

Thus the second roller 10 has two functions: on the one hand it serves as a stretching roller, on the other hand as a tempering station in form of a tempering roller.

The third roller 11 and the fourth roller 12 are configured as tempering rollers, which means that they at least substantially maintain the relatively high temperature level of the stretching roller and thus lead to a relief of the tensions of the stretched double layer film strip 23, which helped to reduce a memory effect of the otherwise occurring shrinkage.

The fifth roller 13, configured as a cooling roller, is connected to the third of the three temperature circuits, namely a cooling circuit. The temperature level in the return conduit of the cooling circuit ideally amounted to between minus 10 K and minus 20 K as compared to the return conduit of the previous roller, i.e. the last tempering roller.

The double layer film strip 23 runs around all five rollers of the processing roller line 8 mostly with static friction. Therefore, the five rollers are ideally surface-coated, more specifically a spiral-shaped groove or a silicone coating.

It shall be understood that each roller can be provided with at least one contacting roller or pressing roller. In prototype tests however, an operation without contacting rollers has proven to be sufficient.

Water has proven of value as a heating and cooling medium for the temper devices 22 and the three tempering circuits.

At the run-out, the blown film installation 1 was operated with a film speed between 94 m/min and 340 m/min and with a stretching ratio between the first roller 9 and the fifth roller 13 between 1:2 and 1:3, wherein it must be mentioned again that a lower stretching ratio of around 1:2 seemed to be better suited for silage pre-stretch products.

In an implementation of the various aspects of the invention the blown film installation 1 provides a blown film line 8 above the pair of haul-off rollers 2 with a heating means for the double layer film strip 23, namely with the heated fluid circuit in the first roller 9 and additionally with the tempering circuit in the second roller 10, in the third roller 11 and in the fourth roller 12.

Thus several active heating means for the double layer film strip 23 are provided here, namely a total of four different rollers.

Providing a heating means in several rollers, at least in two rollers, especially with two different fluid circuits is also advantageous as such.

The second aspect of the invention is implemented by a transverse orientation of a processing roller line disposed, respectively as a partial section, above the pair of haul-off rollers 2, in that the angle between one roller and the next roller in the processing roller line 8 is about 35° to 40° relative to the horizontal, so that they are oriented more horizontally than vertically relative to each other. This leads to the fact that due to their sufficient lateral offset, the rollers can be disposed so low that they overlap in a projection on the virtual plane 14, and are therefore less high than if the diameters of the five rollers were added.

In the second variant of a blown film installation 1' in FIG. 2, the installation can be configured identically or similarly up to the pair of haul-off rollers 2.

Five rollers are again disposed above the pair of haul-off rollers 2 and below the reversing unit 20, namely a first roller 9', a second roller 10', a third roller 11', a fourth roller 12' and a fifth roller 13', upstream of a subsequent deflecting roller 19 disposed at the top.

The five rollers fulfil the same function as described in the first variant according to FIG. 1 and also include three tempering circuits.

In the second variant, the second roller 10' and the fourth roller 12' are however disposed on the same side of the virtual plane 14 as the first roller 9', the third roller 11' and the fifth roller 13'. Thus all the rollers are disposed on the same side of the virtual plane 14.

A direct connection between the nip of the pair of haul-off rollers 2 and the deflecting roller 19 is free, so that the double layer film strip 23 can be optionally guided directly vertically upwards without surrounding the rollers in the processing roller line 8.

However this variant is preferably also arranged as an MDO installation, i.e. for longitudinally stretching the film beyond the yield point of the double layer film strip 23.

The five rollers of the processing roller line 8 have a very small clearance between them, which lies at any rate under 5 cm. Therefore, when starting the blown film installation 1', it is very difficult to thread the film between the rollers of the processing roller line 8 in the shown operating position of the rollers, even if the rollers are driven in the respectively opposite direction of rotation than their predecessor.

In order to thread an end (not shown) of the double layer film strip 23, two rollers, namely the second roller 10' and the fourth roller 12', are displaceable toward the left hand side, i.e. onto the opposite side of the virtual plane 14. The double layer film strip 23 can then be simply threaded vertically through the five rollers. The second roller 10' and the fourth roller 12' are then brought back onto the same side 17 of the virtual plane 14 as the other three rollers and the extrusion process can be operated as a steady state process.

The second roller 10' can preferably be optionally displaced up to the imaginary plane formed by the axes of the roller 9', 11', 13' or even beyond it, so that a continuously adjustable stretching section is provided. Preliminary tests have shown that an adjustability of the stretching length is advantageous for technical reasons, for example because it resulted in a higher fault tolerance with regard to flaws while passing through the imaginary plane.

In the threading position of the second roller 10' and the fourth roller 12', the blown film installation 1' can be operated like a customary blown film installation.

The third variant of a blown film installation 1" according to FIG. 3 has substantially the same structure as the second variant of the blown film installation 1' according to FIG. 2. However, the five rollers of the processing roller line 8" are all located on the first side 16 of the virtual plane 14. Since an entry side into the reversing unit 20 is also located on the first side 16 of the virtual plane 14, the film can be led directly from the fifth roller 13" to the reversing unit 20. A deflecting roller 19 is not necessary.

In addition, the fifth roller 13" is disposed relative to the four previous rollers in such a manner that its edge oriented toward the virtual plane 14 protrudes beyond the previous four rollers, so that the double layer film strip 23 can be led around the four previous rollers without threading and without passing through the processing roller line 8. However, the wrap angle of the double layer film strip 23 around the fifth roller 13" amounts already to almost 90° even without threading, in the threaded state even almost 180° so that a sufficient guidance is provided.

Like in the second variant of the blown film installation 1' according to FIG. 2, the third variant of the blown film installation 1″ according to FIG. 3 also provides a meshing of the second and the fourth roller so that the end of the film can be threaded by simply guiding it straight through the rollers when starting the installation.

The fourth embodiment of the blown film installation 1‴ according to FIG. 4 also has the same configuration as the previously described variants, with the exception of a pair of haul-off rollers 2‴.

However, in the fourth variant of the blown film installation 1‴, the first haul-off roller 3‴ disposed on the same side 16 as the entry into the reversing unit 20 is configured to be displaceable for threading and closing the pair of haul-off rollers 2‴. On the other hand, a second haul-off roller 5‴ located on an opposite side 17 of the virtual plane 14 is, in principle, configured to be fixed.

Above the pair of haul-off rollers 2‴, four rollers of a processing roller line 8‴ are disposed in a horizontal arrangement next to each other, and a fifth roller 13‴ is offset laterally as well as in height relative to said rollers.

With regard to the virtual plane 14 above the pair of haul-off rollers 2‴, three rollers of the processing roller line 8‴ are thus located on the second, here right hand side 17, whereas two rollers of the processing roller line 8‴ are disposed on the first, here left hand side of the virtual plane 14, i.e. on the same side as the entry into the reversing unit 20.

To this end, a machine frame 21‴ for the rollers of the processing roller line 8‴ has a collar 24, which protrudes laterally beyond a main body of the machine frame 21‴. The first roller 9‴ is mounted on the collar 24.

Due to the horizontal arrangement of several rollers of the processing roller line 8‴ next to each other, i.e. here a total of four rollers of the processing roller line 8‴, the blown film installation 1′ as a whole is very low, in spite of the fact that the reversing unit 20 is disposed above the pair of haul-off rollers 2‴ and the processing roller line 8‴.

Two of the rollers in the processing roller line 8‴, here the second roller 10‴ and the fourth roller 12‴ are again configured to be displaceable in a meshing manner, so that the threading into the installation during start-up is facilitated. A pivoting motion can however also be provided, especially when space is limited, so that the second roller 10‴ for example can be configured to be pivotable around the first roller 9‴, while the fourth roller 12‴ for example is configured to be pivotable around the fifth roller 13‴ or around the third roller 11‴.

A straight route 25 for the double layer film strip 23 is left open in a straight prolongation above the pair of haul-off rollers 2‴, i.e. in the virtual plane 14, so that the double layer film strip 23 can also be produced without running through the MDO processing roller line 8‴. In that case it runs straightly upwards toward a straight course deflecting roller 26 and from there into an entry 27 to the reversing unit 20.

The double layer film strip 23 can be alternately led along an MDO route 28, which pivots directly into the opposite side 17 of the virtual plane 14 relative to the entry 27 and runs externally around the first roller 9‴. There it runs through the next four rollers as described above, which also have the same functions as described above.

From the fifth roller 13‴, the double layer film strip 23 finally runs either over a further deflecting roller 29 or, if the wrap of the fifth roller 13‴ is sufficient, directly to the entry 27 into the reversing unit 20.

The fifth roller 13‴ and/or a possibly provided other deflecting roller 29 serving as a cooling roller, or for example other cooling units can be displaceable together or relative to each other, individually or together, so that the cooling path is easily adjustable. For example, the fifth roller 13‴ and the other deflecting roller 29 can be mounted together on the machine frame and rotate around an axis, which lies parallel to the axis of the shown rollers; or the other deflecting roller 29 for example can be displaceable or pivotable vertically downwards, so that the wrap angle of the double layer film strip 23 along the MDO route 28 around the fifth roller 13‴ can be adjusted with quite simple movements and practically continuously. Even with a predetermined cooling temperature it is then possible to adjust the cooling effect before entry of the double layer film strip 23 into the reversing unit 20.

A similar idea can be implemented for example with the first roller 9‴, which ideally serves as a holding roller and simultaneously as a heating roller. This roller may also be adjusted for example in height or laterally, so that the modified geometry of the MDO route of the double layer film strip 23 results in a modified wrap angle around the first roller 9‴ and a modified stretching length.

The same effect can also be achieved by providing another pressing roller there.

In the fifth variant of the blown film installation 1‴, a flattening line 30 is located above the pair of haul-off rollers, and above that, a reversing unit 20 with an entry 27.

A first roller 31, a second roller 32, a third roller 33 and a fourth roller 34 are provided inside the flattening line 30. From there a designated film path via a number of passive deflecting rollers 35 (exemplarily labeled) to the entry 27 into the reversing unit 20 is provided.

The four rollers of the flattening line 30 are in turn provided laterally at a distance from the virtual plane 14, thus resulting in a straight route 25 for the double layer film strip 23 from the pair of haul-off rollers 2 directly to the first passive deflecting roller 35 and from there on to the reversing unit 20, if the double layer film strip 23 must not pass through the flattening system.

As an alternative, the double layer film strip 23 can be guided to the first roller, here for example around the first deflector 236, from there around the roller 32, from there around the third roller 33 and finally around the fourth roller 34 until the double layer film strip 23 returns along this flattening route 37 back to the straight route 25.

Respectively two of the overall four rollers of the levelling line 30 are located substantially at the same height and respectively form a pair with a low construction height. A projection onto the virtual plane 14, results in an overlap area of the first roller 31 and the second roller 32 and even a congruence of the third roller 33 and the fourth roller 34.

A minor overlap is however sufficient for achieving a lower construction height as compared to a construction as shown in FIGS. 2 and 3.

All four rollers of the flattening line 30 ideally have a pressing roller 38 (exemplarily labeled), which is respectively pressed onto the respective roller by way of a pressure arm 39 (exemplarily labeled).

In the present exemplary embodiment pressing rollers are provided on only two of the rollers, namely on the first roller 31, which serves as a holding roller and a heating roller and on the second roller 32, which serves as an extending roller and a tempering roller.

This results in an extending section 40 located between the first roller 31 and the second roller 32, wherein strong tangential forces are generated at the circumferences of the first roller 31 and the second roller 32.

In contrast, the surface speeds of the third roller 33 and the fourth roller 34, configured as cooling rollers, are adjusted in accordance with the surface speed of the second roller 32 in such a manner that there is no longer an extension of the film, or even slower, so that a relaxation can occur.

The described embodiment is intended to be a flattening package, i.e. usually with a maximum stretching of 1:1,05. As opposed to the MDO variants, the stretching length is relatively long.

The resulting longer dwell time in the stretching section is advantageous for a wide process window.

Since only a minor stretching is implemented, a low drive power is sufficient. Individual drives are also unnecessary since the film is only minimally processed. It is therefore sufficient if the holding roller and the second roller 32 are respectively driven and their speeds adjustable.

According to the prototype tests of the inventors, a water heating is sufficient because the required temperature and energy level is low.

In the embodiment as a flattening package, the second roller preferably has the same temperature as the first roller. The first roller serves as a heating and holding roller. The second roller serves as a stretching and tempering roller. The section between the second and the following third roller is a tempering section.

In contrast, in an MDO embodiment, a stretching of 1:10 or even more is possible.

The drawing length should be as short as possible in order to reduce a transversal contraction, known as necking.

The control of the process is much more critical because of the very small dwell time in the very short stretching gap.

Since there are more rollers whose temperature needs to be regulated, there is higher energy expenditure and a quite long tempering section is required.

The drives must be quite strong in order to overcome the elastic limit of the plastic and to easily exceed the yield point.

In order to allow for an individual process control, it is proposed to use individual drives.

An MDO configuration is actually too big for a mere improvement of the flattening and thus normally inefficient.

Since an MDO requires high temperatures, it is normally proposed to use oil heating.

In the fifth implementation variant according to FIG. 6, it is also proposed to provide a transversely oriented processing line above the pair of haul-off rollers. This line is concretely horizontally oriented with four rollers, wherein a cooling roller is disposed further upwards and would allow for a straight guidance of the double layer film strip above the pair of haul-off rollers.

Two rollers are movable inside the horizontally oriented roller line, namely a second roller that is disposed so as to be pivotable around the first roller and a fourth roller that is disposed so as to be displaceable or pivotable and disposed on the other side of the virtual plane 14.

Otherwise the fifth variant according to FIG. 6 is usable in the blown film installation in the exact same manner as the previously described variants.

The fundamental behavior of the films to be processed herein is graphically explained in the diagram of FIG. 7.

The abscissa 41 shows the longitudinal extension a of the film, whereas the ordinate 42 shows the longitudinal tension within the film, i.e. a quantity that is proportional to the longitudinal tension inside the film. The longitudinal tension is labeled a.

Starting from a zero point 43, the film usually shows an increasing longitudinal extension ε in a linear tension increase field 44. From a certain longitudinal extension ε*, respectively the corresponding tension σ* onward, the film leaves the area of a linear increase in tension and the tension curve levels off, i.e. has a lesser increase relative to the abscissa 41.

After the longitudinal extension ε*, the longitudinal extension is irreversible.

The tension a has then reached a first maximum 45. The so-called plastic flow of the film begins at this point. The corresponding longitudinal extension $\varepsilon^{Streck}$ is referred to as the elastic limit. A flow area 46 extends from the first maximum 45 of the longitudinal tension σ, labelled $\sigma_{Streck}$ to the area of the again increasing branch 47, where the longitudinal tension σ again reaches the tension $\sigma_{Streck}$.

From there, the longitudinal tension σ increases again continuously with the increasing longitudinal extension ε until a sudden failure in form of a tear 48 of the film.

The MDO operating range 49 extends from the return to the tension $\sigma_{Streck}$ to the tear of the film.

In contrast, the operating range of a flattening package lies in the area beyond the linear tension increase field 44, but below the elastic limit $\varepsilon^{Streck}$. In the linear tension increase field 44, i.e. up to the longitudinal extension $\varepsilon^{Streck}$, the film behaves elastically.

To put it simply, an extension of a flattening package takes place between ε* and the local maximum. In contrast, the stretching of an MDO occurs after the return to $\sigma_{Streck}$.

With regard to its construction with five rollers, the processing roller line 50 in FIG. 8 corresponds in principle to the second variant according to FIG. 2 and to the third variant from FIG. 3, but has three meshing rollers, the first roller 51, the third roller 52 and the fifth roller 53, whereas its second roller 54 and its fourth roller 55 are designed to be stationary and rotative.

In order to thread the double layer film strip at the beginning of a blowing process, the three meshing rollers, i.e. the first roller 52, the third roller 52 and the fifth roller 53 are moved out of their meshed position, i.e. in FIG. 8 toward the left of the virtual plane 14, so that the double layer film strip can simply be moved vertically upward from a nip 56 of the pair of haul-off rollers 57 to a deflecting roller 58. The deflecting roller 58 is the first roller that lies beyond the processing roller line 50. After the deflecting roller 58 the double layer film strip is guided transversely to an entry 59 into the reversing unit 60.

During meshing, the first roller 51 can not only be displaced into the plane of the stationary rollers, i.e. the second roller 54 and the fourth roller 55 (shown in FIG. 8 by a first contour 61 of the meshed first roller 51); the first roller 51 can also be displaced through this plane, so that the central axis of the first roller 51 moves beyond the plane formed by the central axes of the second roller 54 and the fourth roller 55. The first roller 51 can thus take up a position, in which it has passed through the plane, for the blowing operation (shown in figure by a second contour 62 of the first roller 51).

During prototype tests, it turned out that a preferably continuous adjustability of the meshing depth, i.e. more specifically with a meshing depth through the plane of the stationary rollers, can be advantageous for the safety of the process and the resulting quality of the film.

The processing roller line 63 according to the seventh variant in FIG. 9 has a somewhat different construction:

The processing roller line 63 is located above the pair of squeezing roller 64 in a vertical orientation.

A first roller 65 is designed as a heating roller and at the same time as a holding roller. It is displaceable so as to mesh through the virtual plane 14. The meshing has already been described repeatedly above. It is assumed that its advantages and the possibility of a meshing through the plane of the stationary rollers are now known.

A second roller 66 is provided with a significantly smaller diameter than the first roller 65.

A third roller 67 is also provided with a lesser diameter than the first roller 65, preferably with the same diameter as the second roller 66, as shown here.

The second roller 66 and the third roller 67 form a stretching station, in which the third roller 67 is configured to mesh. Due to the continuous adjustability of at least one of the two rollers 66, 67 of the stretching station, the stretching length can be continuously adjusted, which turned out to be very advantageous during prototype tests.

The second roller 66, which is at the same time a first roller of the stretching station, is preferably driven with the same circumferential speed as the first roller 65, i.e. as the big holding roller. In consideration of the function of the holding station, the second roller 66 should be attributed to the holding station rather than the stretching station, namely together with the first roller 65. In consideration only of its diameter, it is also possible to attribute the second roller 66 together with the third roller 67 to the stretching station.

The two small rollers, i.e. the second roller 66 and third roller 67 are not heated but driven. This makes it possible to design the second roller 66 and the third roller 67 with a very small diameter.

However, the third roller 67 is driven at a higher circumferential speed than the second roller 66. Thus a stretching section for the double layer film strip is formed between the second roller 66 and the third roller 67.

Assuming that with the given geometric conditions there is a static friction for instance covering 70° around the circumference of the faster driven third roller 67, and the diameters of the big rollers lie between 250 mm and 290 mm and the diameters of the small rollers lie between 100 mm and 140 mm, the stretching length of the stretching section amounts to between 15 cm and 19 cm. During a prototype test it amounted to about 17 cm.

After the faster driven third roller 67, the processing roller line 63 is provided with a first tempering roller 68 and a second tempering roller 69, wherein the latter can also be brought into its meshed operating position.

The two tempering rollers 68, 69 are followed by a cooling roller 70; in the present example with a slightly increased diameter. The cooling roller 70 has a contact roller 71.

Together with its contact roller 71, the cooling roller 70 forms the last station of the processing roller line 63. From there, the double layer film strip is guided to the entrance to the reversing unit.

The rollers of the processing roller line 63 are disposed quite close to each other, with a clearance in a vertical arrangement of only about 10 mm to 30 mm, in order to achieve a construction height that is as small as possible.

Several or all roller surfaces of the processing roller line 63 preferably have a rough, non-slip surface, ideally with embedded silicone.

LIST OF REFERENCE NUMBERS 1 blown film installation
2 pair of haul-off rollers
3 first haul-off roller
4 first holder
5 second haul-off roller
6 adjusting cylinder
7 sliding bearing support
8 processing roller line
9 first roller
10 second roller
11 third roller
12 fourth roller
13 fifth roller
14 virtual plane
15 central axis
16 first side
17 opposite second side
18 gap
19 deflecting roller
20 reversing unit
21 machine frame
22 temper devices
23 double layer film strip
24 collar
25 straight route
26 straight route deflecting roller
27 entry
28 MDO route
29 other deflecting roller
30 flattening line
31 first roller
32 second roller
33 third roller
34 fourth roller
35 passive deflecting roller
36 first deflector
37 flattening route
38 pressing roller
39 pressure arm
40 flattening extension section
41 abscissa
42 ordinate
43 zero point
44 linear tension increase field
45 first maximum
46 flow area
47 ascending branch
48 film tear
49 MDO operating range
50 processing roller line
51 first roller
52 third roller
53 fifth roller
54 second roller
55 fourth roller
56 nip
57 pair of haul-off rollers
58 deflecting roller
59 entry
60 reversing unit
61 first contour
62 second contour
63 processing roller line
64 pair of squeezing rollers
65 first roller
66 second roller
67 third roller
68 first tempering roller
69 second tempering roller
70 cooling roller
71 contact roller

The invention claimed is:

1. A blown film installation (1) with an annular nozzle for extruding a film tube, with a tube formation area for longitudinal and transverse stretching of the film tube, with a cooling means for the film tube moving in the machine direction, with a collapsing section of the film tube into a double layer film strip and with a pair of haul-off rollers beyond the cooling means for hauling off the film tube, wherein a processing roller line (8) for longitudinal stretching of the double layer film strip is disposed beyond the pair of haul-off rollers (2) in the machine direction,
wherein
the machine direction is oriented vertically from the bottom up and the processing roller line (8) is disposed above the pair of haul-off rollers, wherein a heating means is provided for the double layer film strip (23); and
wherein a reversing unit (20) is provided above the processing roller line (8).

2. The blown film installation according to claim 1, wherein a heating section is provided upstream of the first stretching roller.

3. The blown film installation according claim 1, wherein the processing roller line has a closed-loop temperature control system, wherein the heating means initially heats the double layer film strip by less than 80 K.

4. The blown film installation according to claim 1, wherein the processing roller line has a heating roller for heating up the double layer film strip for an easier processing in the processing roller line.

5. The blown film installation according to claim 1, wherein the processing roller line has a stretching section for a longitudinal stretching of the double layer film strip, with a stretching range with a length of 120 cm at the most.

6. The blown film installation according to claim 4, wherein the processing roller line has a tempering roller, downstream of the stretching section, for releasing the tension of the double layer film strip after stretching.

7. The blown film installation according to claim 1, wherein the tempering roller has a closed-loop temperature control system, which heats up the double layer film strip by less than 30 K.

8. The blown film installation according to claim 1, wherein the processing roller line has a cooling means for the double layer film strip.

9. The blown film installation according to claim 1, wherein the processing roller line has a closed loop control system for improving a flattening, with an extension of the double layer film strip by 0.5% to 5%.

10. The blown film installation according to claim 1, wherein the processing roller line has a closed-loop control system for stretching, with a stretching of the double layer film strip by more than 5%.

11. The blown film installation according to claim 1, wherein the processing roller line has a heating roller for the double layer film strip with a temperature gradient of plus/minus 0 K or of plus 1 K to plus 80 K or more in the case of fast moving double layer film strips.

12. The blown film installation according to claim 1, wherein the processing roller line has a stretching roller for the double layer film strip with a temperature gradient of minus 10 K.

13. The blown film installation according to claim 1, wherein one of the stretching rollers have a smaller roller diameter than the roller of the previous station and/or than the roller of the following station and/or than a roller of the other stations of the processing roller line.

14. The blown film installation according to claim 13, wherein the first and the second stretching roller are both designed with a smaller roller diameter, so that the second stretching roller is preceded by the first stretching roller as a slower driven roller with a smaller roller diameter than the roller of the previous and/or than the roller of the following station and/or than a roller of the other stations of the processing roller line.

15. The blown film installation according to claim 1, wherein the processing roller line has a tempering roller for the double layer film strip with a temperature gradient of minus 10 K.

16. The blown film installation according to claim 1, wherein the processing roller line has a cooling roller for the double layer film strip with a temperature gradient of minus 10 K to minus 80 K, or minus 100 K in the case of fast moving double layer film strips, as compared to the previous station in the machine direction.

17. The blown film installation according to claim 1, wherein the processing roller line has a threading aid with a displaceable or pivotable roller, wherein the meshing depth is adjustable in a continuous or stepped manner.

18. The blown film installation according to claim 1, wherein a silicone inlay is provided in a roller surface in the processing roller line.

19. A method for producing a blown film strip in a blown film installation, with the steps of
a. extruding a film tube;
b. inflating the film tube in a tube formation area for longitudinal and transverse stretching of the film tube;
c. cooling the ascending film tube with a cooling means;
d. collapsing the film tube into a double layer film strip by means of a collapsing section;
e. hauling off the double layer film strip with a pair of haul-off rollers;
comprising the further steps of:
f. guiding the double layer film strip further upwards above the pair of haul-off rollers and through a processing roller line (8) with a heating means for heating up the double layer film strip; and
g. processing the double layer film strip in the processing roller line; and
providing a reversing unit (20) above the processing roller line (8).

20. The method according to claim 19, wherein, in order to thread the double layer film strip at the start-up of the blown film installation, a roller of the processing roller line is displaced or pivoted away from its operating position and the double layer film strip is tensioned after threading by means of a return displacement or pivoting.

21. The method according to claim 19, wherein, during processing, the double layer film strip is embossed, irradiated and/or subjected to a corona treatment.

22. The blown film installation according to claim 2, wherein a heating section is provided wherein all the rollers upstream of the first stretching roller are actively heated up, or exactly one holding roller and one separate heating roller.

23. The blown film installation according claim 3, wherein the processing roller line has a closed-loop temperature control system, wherein the heating means initially heats the double layer film strip by less than 30 K.

24. The blown film installation according to claim 5, wherein the processing roller line has a stretching section for a longitudinal stretching of the double layer film strip, with a stretching range with a length of 50 cm at the most.

25. The blown film installation according to claim 7, wherein the tempering roller has a closed-loop temperature control system, which heats up the double layer film strip by less than 20 K.

26. The blown film installation according to claim 8, wherein the processing roller line has a cooling roller as said cooling means for the double layer film strip.

27. The blown film installation according to claim 10, wherein the processing roller line has a closed-loop control system for stretching, with a stretching of the double layer film strip by more than 100%.

28. The blown film installation according to claim 11, wherein the processing roller line has a heating roller for the double layer film strip made of polypropylene, as compared with the previous station in the machine direction and/or the roller temperature of the haul-off roller.

29. The blown film installation according to claim 12, wherein the processing roller line has a stretching roller for the double layer film strip with a temperature gradient of plus 10 K to plus 30 K, in the case of fast moving double layer film strips, as compared to the previous station in the machine direction.

30. The blown film installation according to claim 13, wherein one of the stretching rollers, or extension rollers, have a smaller roller diameter than the roller of the previous station and/or than the roller of the following station and/or than a roller of the other stations of the processing roller line, with a diameter reduced by at least 25%.

31. The blown film installation according to claim 14, wherein the first and the second stretching roller, or an extension roller, are both designed with a smaller roller diameter, so that the second stretching roller is preceded by the first stretching roller as a slower driven roller with a smaller roller diameter than the roller of the previous or than the roller of the following station or than a roller of the other stations of the processing roller line.

32. The blown film installation according to claim 15, wherein the processing roller line has a tempering roller for the double layer film strip with a temperature gradient of plus 5 K to plus 30 K, in the case of fast moving double layer film strips, as compared to the previous station in the machine direction.

33. A method for producing a blown film strip in a blown film installation according to claim 19, wherein step g comprises g. processing the double layer film strip in the processing roller line, comprising stretching the double layer film strip in a stretching section of the processing roller line.

* * * * *